(12) United States Patent
Ramaswamy

(10) Patent No.: US 11,933,339 B2
(45) Date of Patent: Mar. 19, 2024

(54) UNIVERSAL TORQUE INDICATOR FITTING WITH POSITIVE LOCK FEATURE

(71) Applicant: Parker-Hannifin Corporation, Cleveland, OH (US)

(72) Inventor: Nagarajan Ramaswamy, Fort Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 102 days.

(21) Appl. No.: 17/878,117

(22) Filed: Aug. 1, 2022

(65) Prior Publication Data

US 2023/0056893 A1 Feb. 23, 2023

Related U.S. Application Data

(60) Provisional application No. 63/234,722, filed on Aug. 19, 2021.

(51) Int. Cl.
*F16B 31/02* (2006.01)

(52) U.S. Cl.
CPC .......... *F16B 31/024* (2013.01); *F16L 2201/00* (2013.01)

(58) Field of Classification Search
CPC ...... F16B 31/024; F16B 31/02; F16B 31/028; F16L 2201/10; F16L 2201/30; F16L 19/025

See application file for complete search history.

(56) References Cited

U.S. PATENT DOCUMENTS

| 5,280,967 | A | * | 1/1994 | Varrin, Jr. ............... F16L 19/02 |
| | | | | 285/915 |
| 6,557,900 | B1 | | 5/2003 | Austin |
| 6,694,827 | B2 | | 2/2004 | Austin |
| 7,013,936 | B2 | | 3/2006 | Schliemann et al. |
| 7,032,931 | B2 | | 4/2006 | Austin |

(Continued)

FOREIGN PATENT DOCUMENTS

WO    2015187958 A1    12/2015

*Primary Examiner* — David Bochna
(74) *Attorney, Agent, or Firm* — Renner, Otto, Boisselle & Sklar, LLP

(57) ABSTRACT

A fitting assembly includes an indicator assembly that provides a visual indication of torque value to verify when the desired operational torque value is achieved. The fitting assembly includes a nut, and a visual indicator assembly positioned on the nut which has a plurality of visual indicators that provide a visual indication of a torque level being applied. A sleeve is attached to the nut and includes a window through which a portion of the visual indicators is visible based on the torque level being applied. A resilient member couples the sleeve to the nut. As the nut is rotated to apply torque to the nut, the resilient member biases the sleeve in a fixed position and the nut rotates relative to the sleeve, whereby the visual indicator assembly rotates relative to the sleeve to alter which portion of the visual indicator assembly is visible through the window to provide a visual indication of when the operational torque level is being applied. The fitting assembly includes a positive locking feature that interacts with a serrated portion of a nipple fluid connection to positively lock a position of the nut to prevent nut loosening.

20 Claims, 13 Drawing Sheets

(56) References Cited

U.S. PATENT DOCUMENTS

| | | | |
|---|---|---|---|
| 7,156,424 B2 | 1/2007 | McCord | |
| 9,784,389 B2 | 10/2017 | Fukano et al. | |
| 2011/0278837 A1* | 11/2011 | Yamamoto | F16L 19/005 |
| | | | 285/87 |
| 2021/0131590 A1* | 5/2021 | Coello | F16B 31/02 |
| 2021/0317930 A1* | 10/2021 | Marc | F16L 19/025 |
| 2022/0307630 A1* | 9/2022 | Ehrke | F16L 19/025 |
| 2023/0096808 A1* | 3/2023 | Ferkel | F16L 19/0212 |
| | | | 285/93 |

\* cited by examiner

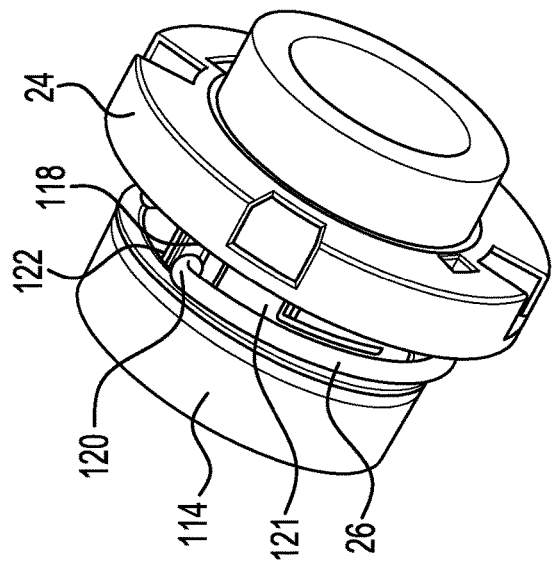
FIG. 22
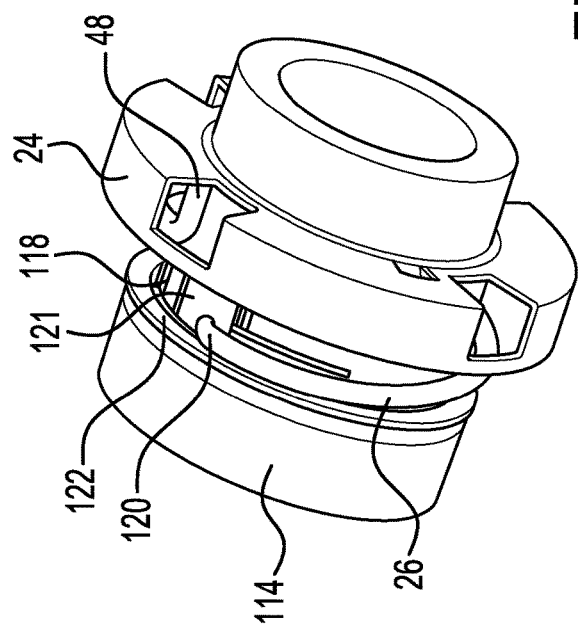
FIG. 23
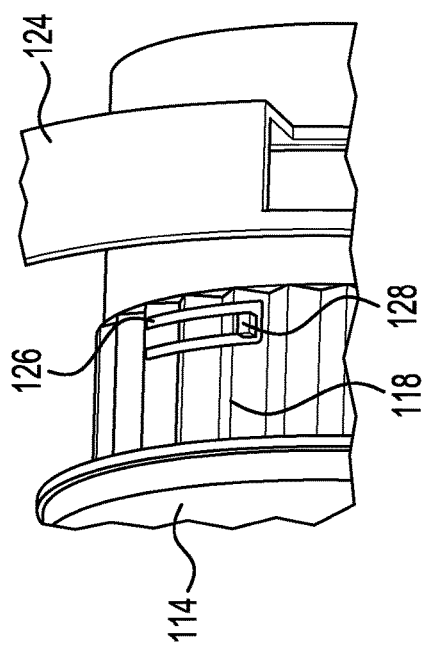

UNIVERSAL TORQUE INDICATOR FITTING WITH POSITIVE LOCK FEATURE

This application claims priority of U.S. Application No. 63/234,722 filed Aug. 19, 2021, which is hereby incorporated herein by reference in its entirety.

TECHNICAL FIELD

The present application relates to a torque indicating device for fluid connector fittings.

BACKGROUND

Industry professionals attribute the loosening of some fluid connections to improper tightening of the fluid connector fitting done by a mechanic. Improper tightening may be attributed to an installation or maintenance error, or the mechanic simply may not have tightened the fitting with a torque wrench or similar tool. Visually, there typically is no indication on the fluid connector fitting that a nut has been properly tightened to the appropriate torque value. To ensure proper tightening in conventional systems, a quality control person or an inspector must go through and check all the system's connector fittings with a torque wrench to ensure that the nuts are secured at the required torque values. Sometimes, however, it is not possible to access a fitting for inspection (or a leaking fitting) during normal operation, which can require reworking or removing some fittings and other proximate components to access the fitting to be inspected. Such manual quality control is therefore cumbersome and time consuming.

Another problem associated with the use of nuts in fluid connection fittings is the potential for the nuts to back out or loosen due to vibrational effects, environmental conditions, external loads, and other dynamic loads, which can cause loss of pretension and nut back-off. In fluid connector fittings in particular, the most common method used to resist unwanted nut backing off is safety wire. Safety wire installation is costly because of the labor involved in fixing the safety wire to the nut and to its adjacent component after tightening of the nut. The safety wire prevents nut loosening, but otherwise does not compensate for loss of clamp load, thread pretension, and material or strain relaxation.

SUMMARY OF THE INVENTION

There is a need in the art, therefore, for an improved fluid fitting assembly that provides an enhanced and effective visual indication as to whether proper torque tightening has been applied. The present disclosure relates to a fluid fitting assembly that provides a visual indication to show that the fluid fitting assembly has been torqued properly. The fitting assembly also may provide a positive locking feature to prevent nut loosening and loss of clamp load during use. In exemplary embodiments, the fitting assembly has a torque indicating mechanism which has a visual indicator that changes visually with torque level as the nut is tightened, such as for example a color indicator changing color from red to green, when the desired operational torque value is reached, thus indicating that a proper torque has been achieved. A secondary visual indicator between a primary visual indicator, such as for example a color indicator being a yellow color visible between red and green indications, may show that the torque value is below the desired value. In exemplary embodiments, the fitting assembly further includes a retention mechanism that provides a desired amount of resistance to loosening of the component parts of the assembly during use and while still permitting the fluid fitting assembly to be disassembled as needed for maintenance or repair, and then readily reassembled.

This fitting assembly of the present disclosure is suitable for use on any shoulder nut and wire-on nut configuration, such as for example configurations with flared, flareless, beam seal, or ball nose ends. The fitting assembly of the present disclosure also is suitable for use on various fluid connection configurations for various applications, including for example hose assemblies, tube assemblies, fuel manifolds, hydraulic fittings, and other applications in which nuts are used. Relatedly, the fitting assembly my be employed in accordance with various industry standards, such as for example SAE, AS, ABS, and MIL industry standards, and otherwise may be configured for various other fitting dimensions and overall envelope configurations. Additionally, assembly process modifications or changes, and special tool or fixture configurations, generally are not required to assemble the fitting assembly.

This fitting assembly generally is adaptable to any suitable connector parameters in common usage, such as being adaptable for various sizes, various materials, and various temperatures of operation including higher operating temperature, without requiring structural modification in relation to typical parameter needs or industry standards. The fitting assembly does not require a torque wrench to verify the operational torque value of the fluid connection. The configuration of the fitting assembly also prevents the nut from backing up or loosening due to vibration effects, environmental conditions, and other dynamic external loads, and thus also prevents loss of clamp load, thread pretension, and material or strain relaxation.

An aspect of the invention, therefore, is a fitting assembly that includes an indicator assembly that provides a visual indication of torque value to verify when the desired operational torque value is achieved. In exemplary embodiments, the fitting assembly includes a nut having a first end and a second end opposite from the first end; a visual indicator assembly positioned on the first end of the nut, the visual indicator assembly including a plurality of visual indicators that provide a visual indication of a torque level being applied to the nut; a sleeve attached to the nut and including a window through which a portion of the plurality of visual indicators is visible based on the torque level being applied to the nut; and a resilient member that couples the sleeve to the nut. As the nut is rotated to apply torque to the nut, the resilient member biases the sleeve in a fixed position and the nut rotates relative to the sleeve, whereby the visual indicator assembly rotates relative to the sleeve to alter which portion of the visual indicator assembly is visible through the window to provide a visual indication of when the torque level being applied to the nut is a desired operational torque level.

The visual indicator assembly may include a first visual indicator that indicates an insufficient torque level is being applied to the nut, and a second visual indicator different from the first visual indicator (e.g., different color indicators) that indicates the desired operational torque level is being applied to the nut. The visual indicator assembly further may include an intermediate visual indicator that is different from and positioned between the first visual indicator and the second visual indicator, wherein the first visual indicator indicates a zero torque level being applied to the nut, the intermediate visual indicator indicates that a non-zero but insufficient torque level is being applied to the nut, and the second visual indicator indicates that the desired operational torque level is being applied to the nut. The visual indicator assembly further may include a plurality of torque level markings corresponding to different torque levels, and the sleeve further may include a pointer positioned in the window that points to one of the plurality of torque level markings corresponding to a torque level being applied to the nut.

In an exemplary embodiment, the sleeve includes a telescoping portion that is positioned inserted within the nut, and a cover portion that is positioned extending around and over the first end of the nut and the visual indicator assembly.

In an exemplary embodiment, the resilient member is a coil spring having a first end configured as a spring leg that is positioned inserted within a spring groove formed in the nut, and a second end that is positioned against the sleeve.

In an exemplary embodiment, the fitting assembly further includes a spring pin that is configurable from an extended position corresponding to a zero-torque state of the torque level being applied to the nut to a retracted position corresponding to a non-zero torque state of the torque level being applied to the nut; wherein in the extended position the spring pin couples the sleeve to the nut such that the sleeve and the nut rotate together, and in the retracted position the spring pin coupling of the sleeve to the nut is disengaged such that the nut rotates relative to the sleeve.

In an exemplary embodiment, the spring pin is a separate component from the nut and the sleeve, and in the extended position the spring pin is positioned in a nut pin hole in the nut and extends through a sleeve pin hole in the sleeve to couple the sleeve to the nut, and in the retracted position the spring pin does not extend through the sleeve pin hole to disengage the nut from the sleeve.

In an exemplary embodiment, the spring pin has a spiraled or rolled pin configuration.

In an exemplary embodiment, the fitting assembly further includes an audio indicator including a protrusion fixed to an internal surface of the sleeve, wherein as the nut rotates relative to the sleeve, the spring pin contacts the protrusion to provide an audio indication of when the desired operational torque level is being applied to the nut.

In an exemplary embodiment, the spring pin is configured as a bend in a surface of the sleeve, and in the extended position the spring pin is positioned in a nut pin hole in the nut to couple the sleeve to the nut, and in the retracted position the spring pin does not extend into the nut pin hole to disengage the nut from the sleeve.

In an exemplary embodiment, the second end of the nut includes internal threads for connecting with external threads of a fluid section, and the nut further includes an undercut that receives a portion of the sleeve, the undercut being a deeper cut relative to a minimum full thread depth of the internal threads.

In an exemplary embodiment, the fitting assembly further includes a wire positioned within a groove in the nut and against a portion of the sleeve.

Another aspect of the invention is a fluid connection assembly including the fitting assembly according to any of the embodiments and a nipple fluid section that is connected to the nut through the first end of the nut. In exemplary embodiments, the nipple fluid connection includes an external surface having a serrated portion, and the fitting assembly includes a positive locking feature that interacts with the serrated portion of the nipple fluid connection to positively lock a position of the nut to prevent nut loosening during use. The positive locking feature may include a vertical spring leg of the resilient member, and the vertical spring leg moves up and down over the serrated portion of the nipple fluid section such that when the desired operational torque level is applied to the nut, the vertical spring leg is positioned within a groove of the serrated portion to positively lock the position of the nut. The positive locking feature further may include a spring tab of the sleeve that ends in a pawl, and the spring tab moves up and down over the serrated portion of the nipple fluid section such that when the desired operational torque level is being applied to the nut, the pawl is positioned within a groove of the serrated portion to positively lock the position of the nut.

In an exemplary embodiment, the sleeve includes a contact surface, and the vertical spring leg slides over the contact surface during a portion of nut rotation during which an insufficient torque level is being applied to the nut; and the sleeve further includes a locking window positioned adjacent to the sliding surface, and when the desired operational torque level is applied to the nut the vertical spring leg is positioned through the locking window to be positioned within the groove of the serrated portion of the nipple fluid section.

In an exemplary embodiment, the contact surface and the locking window of the sleeve are positioned such that the vertical leg spring slides against the contact surface during nut rotation when the torque level being applied to the nut is 75% of the desired operational torque level or less, and the vertical leg spring extends through the window and moves up and down over the serrated portion of the nipple fluid section when the torque level being applied to the nut is more than 75% of the desired operational torque level.

In an exemplary embodiment, the vertical spring leg is oriented at an angle relative to a radial direction of the nipple fluid section.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 22 is a drawing depicting operation of the positive lock feature of the fitting assembly.

FIG. 23 is a drawing depicting an alternative sleeve design for providing a positive locking feature.

DETAILED DESCRIPTION

Figure 1:
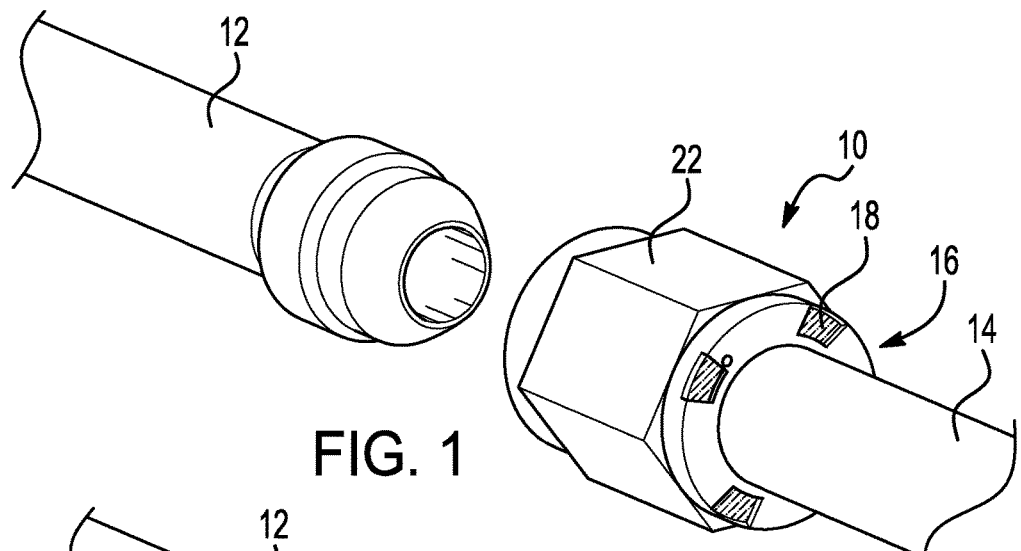
FIG. 1 is a drawing depicting an exemplary fitting assembly in a disconnected state relative to a fluid section, in accordance with embodiments of the present application.

Embodiments of the present application will now be described with reference to the drawings, wherein like reference numerals are used to refer to like elements throughout. It will be understood that the figures are not necessarily to scale.

Figure 2:
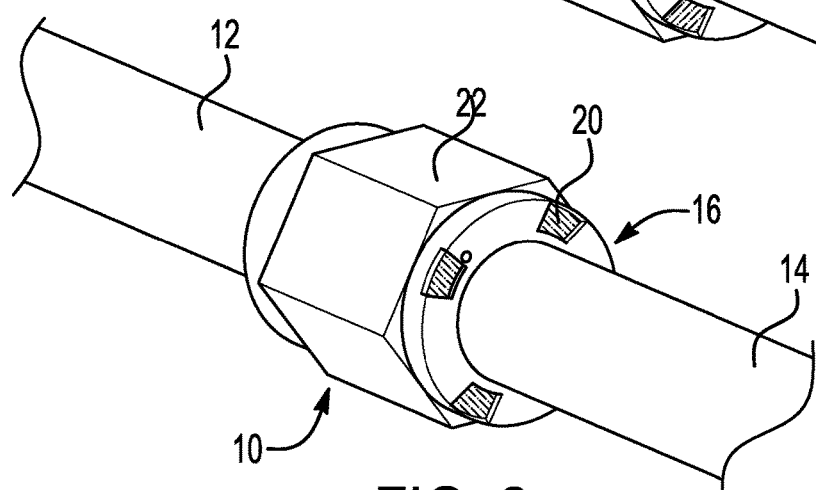
FIG. 2 is a drawing depicting the fitting assembly of FIG. 1 in a connected state relative to the fluid section.

FIG. 1 is a drawing depicting an exemplary embodiment of a fitting assembly 10 in a disconnected state relative to a first fluid section 12 in accordance with embodiments of the present application. FIG. 2 is a drawing depicting the fitting assembly 10 in a connected state relative to the first fluid section 12. The fitting assembly 10 also is shown mounted to a second fluid section 14, which typically is the nipple fluid connection that is joined with the first fluid section 12 by the fitting assembly 10. In the connected state, a fluid can flow between the first and second fluid sections 12 and 14, through the fitting assembly 10. As referenced above, the fitting assembly 10 is more generally applicable to various applications, including for example hose assemblies, tube assemblies, fuel manifolds, hydraulic fittings, and other applications in which nuts are used to joint fluid sections together.

The fitting assembly 10 includes a visual indicator assembly 16 that provides an indication of whether the fitting assembly has been tightened to form the fluid connection with a desired operational torque level. The visual indicator assembly 16 includes a first visual indicator 18 and a second visual indicator 20 that differs from the first visual indicator 18. The difference between the first versus second visual indicators provides a visual indication as to whether the fitting assembly has been torqued to an appropriate or correct operational torque level. In the example depicted in FIGS. 1 and 2, the first visual indicator 18 provides a visual indication that the fitting assembly is connected with an insufficient torque level, and including there being no torque (disconnected state). The second visual indicator 20 provides a visual indication that the fitting assembly is connected with an appropriate or correct operational torque level.

Figure 3:
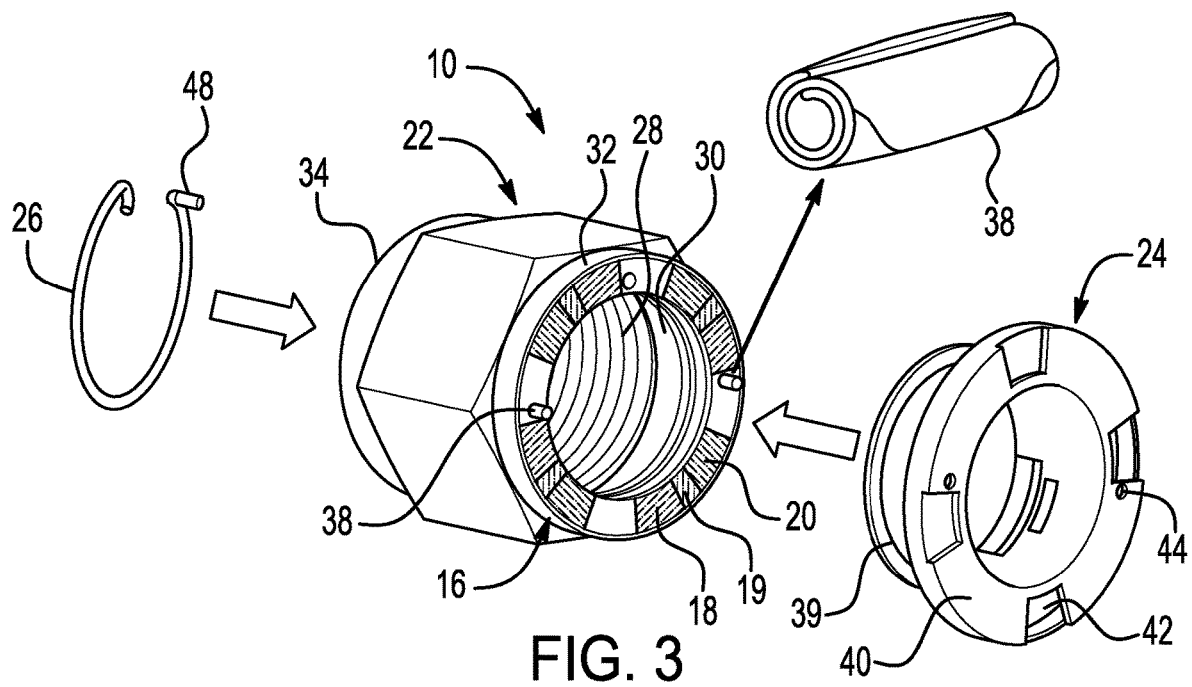
FIG. 3 is a drawing depicting an exploded view of the fitting assembly, which illustrates the principal components of the fitting assembly including a nut, a sleeve, and a resilient member.

In an exemplary embodiment, the difference between the first versus second visual indicators 18 and 20 may be different colors. For example, the fitting assembly 10 in FIG. 1 is not coupled to the fluid section 12 (no torque being applied) and therefore the visual indicator assembly 16 may show a red color first visual indicator 18, whereas the fitting assembly 10 in FIG. 2 is coupled to the fluid section 12 and therefore the visual indicator assembly 16 may show a green color second visual indicator 20. The color visual indicators may be applied to the nut using a color laser marking technique, such as for example using a master oscillator power amplifier (MOPA) color marking laser. Although different color visual indicators may be employed as one example, other bases for the first versus second visual indicators may be employed, such as for example different patterning, different shading, or the like so long as the visual indicators are different. In addition, FIGS. 1 and 2 depict only two visual indicators, which also may be varied depending upon the size and use application of the fitting assembly. Additional and further different visual indicators may be provided intermediately between the first and second visual indicators 18 and 20 (see, e.g., FIG. 3 illustrating a third visual indicator 19 between the first visual indicator 18 and the second visual indicator 20). For example, in a color indication scheme, a yellow color indicator may be provided between the red and green color indicators. In such a color-based indicator scheme, red may correspond to full disconnection and zero torque, yellow may correspond to a non-zero torque being applied but below the proper operational torque level, and green may correspond to torque being applied at the proper operational torque level. It will be appreciated that alternative colors may be used, or non-color based visual differences may be used, to provide the different visual indicators. Alternatively to laser marking, other methods of forming the different visual indicators may include, for example, applying a plastic (Nylon or similar) ring such as by machining or injection molding, 3D printing the indicators, or press-fitting or gluing an indicator ring over the nut surface. A fluorescent paint also may be employed to form the visual indicator assembly, which is particularly suitable for use in dark environments.

Accordingly, the visual indicator assembly 16 includes at least the first visual indicator 18 that indicates an insufficient torque level is being applied to the nut, and the second visual indicator 20 different from the first visual indicator that indicates the desired operational torque level is being applied to the nut. The visual indicator assembly 16 further may include the intermediate visual indicator 19 that is different from and positioned between the first visual indicator and the second visual indicator. In one example of the three-indicator configuration, the first visual indicator indicates a zero torque level being applied to the nut, the intermediate visual indicator indicates that a non-zero but insufficient torque level is being applied to the nut, and the second visual indicator indicates that the desired operational torque level is being applied to the nut.

Figure 4:
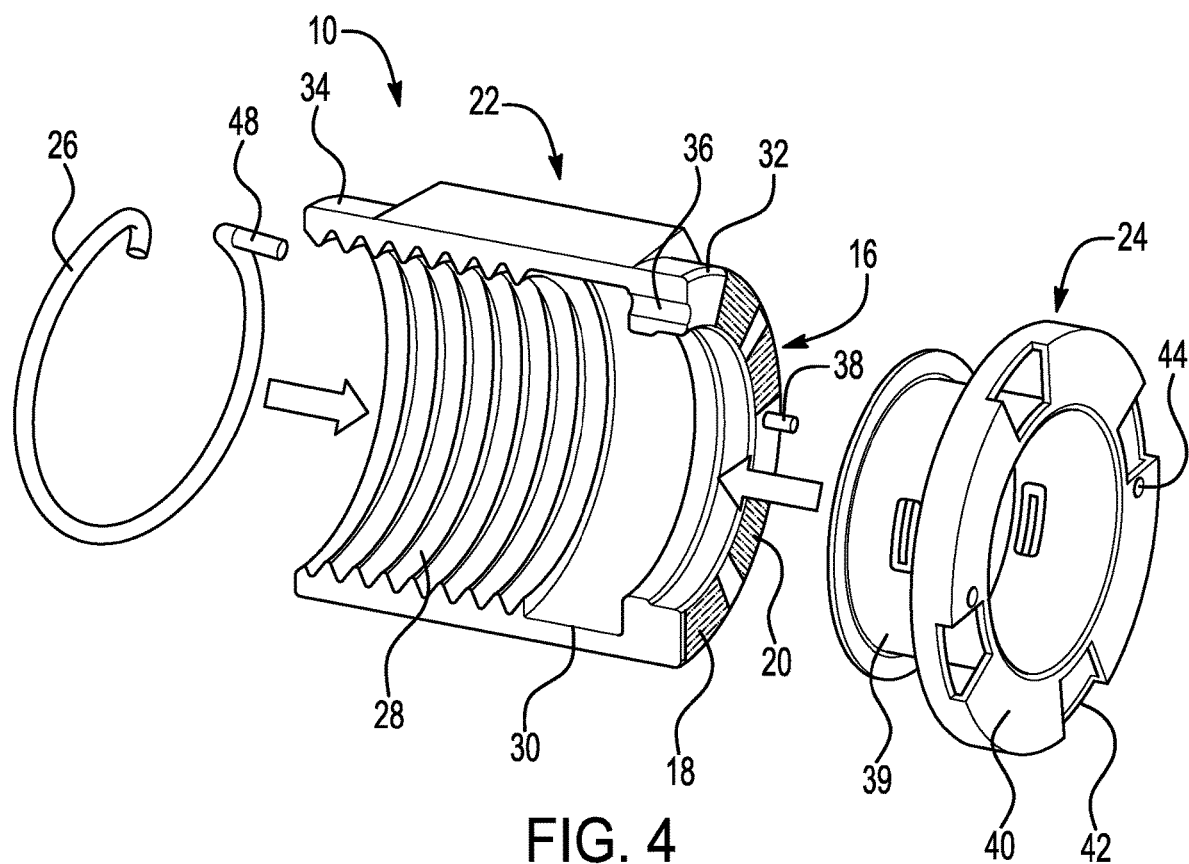
FIG. 4 is a drawing depicting the exploded view of the fitting assembly of FIG. 3, with the nut shown in cross-section.

FIG. 3 is a drawing depicting an exploded view of the fitting assembly 10, which illustrates the principal components of the fitting assembly 10. The fitting assembly 10 includes a nut 22, a sleeve 24, and a resilient member 26. FIG. 4 is a drawing depicting the exploded view of the fitting assembly 10 of FIG. 3, with the nut 22 shown in cross-section to depict the internal configuration of the nut 22. Generally, the fitting assembly 10 includes a nut having a first end and a second end opposite from the first end; a visual indicator assembly positioned on the first end of the nut, the visual indicator assembly including a plurality of visual indicators that provide a visual indication of a torque level being applied to the nut; a sleeve attached to the nut and including a window through which a portion of the plurality of visual indicators is visible based on the torque level being applied to the nut; and a resilient member that couples the sleeve to the nut. As the nut is rotated to apply torque to the nut, the resilient member biases the sleeve in a fixed position and the nut rotates relative to the sleeve, whereby the visual indicator assembly rotates relative to the sleeve to alter which portion of the visual indicator assembly is visible through the window to provide a visual indication of when the torque level being applied to the nut is a desired operational torque level, In the example of FIGS. 3 and 4, the nut 22 includes internal threads 28 for mating with the first fluid section 12, and an internal face 30 for receiving the sleeve 24 and the resilient member 26. The nut 22 further includes a first end 32 and a second end 34 opposite from the first end 32, and the visual indicator assembly 16 is located on the first end 32 being applied using laser marking or other suitable method referenced above. The nut 22 further includes a spring groove 36 (see particularly FIG. 4) for receiving the resilient member 26 and spring pins 38 for initially mounting and aligning the sleeve 24 relative to the nut, as further detailed below. The spring groove 36 and holes for the spring pins 38 may be machined into the nut 22 from the threaded second end 34 of the nut to avoid additional secondary operations. The nut may be machined with double or triple start threads depending on the size of the nut. With the described configuration of the fitting assembly, installation time generally is reduced by approximately half of the time for double start threads, and approximately one-third of the time for triple start threads, without contributing additional cost. The use of multi-start threads is a well-proven robustness method as compared to conventional tapered threads, which is particularly suitable for fluid connectors used in aerospace applications.

FIG. 3 also illustrates a close-up view of an exemplary configuration of the spring pins 38 for use in the example of FIGS. 3 and 4. The spring pins 38 may be configured to have a spiraled or rolled pin configuration to provide some resiliency in the interaction of the spring pins within the corresponding holes in the nut 22.

In the example of FIGS. 3 and 4, the sleeve 24 is formed as a single, integrated piece of material. For example, the sleeve 24 may be made of a suitable ferrous alloy, non-ferrous alloy, steel or a steel alloy or stainless steel, precipitation-hardening stainless steel, nickel-base alloy, cobalt-base alloy, tool steel and high-speed steel, a functional alloy (Invar®, Kovar®), aluminum, titanium, composite, or a polymer. The sleeve may be made through either one or combination of processes such as a sheet metal processing, additive manufacturing processing, machining, casting, injection molding, and metal injection molding. Although shown as a single integral piece in FIGS. 3 and 4, the sleeve alternatively can be formed of multiple pieces, which are joined together by any suitable joining method such as welding, brazing, spot welding, folding, bending, crimping, and gluing.

The sleeve 24 includes a telescoping end 39 and a cover end 40 opposite from the telescoping end 39, with the cover end 40 being widened relative to the telescoping end 39. During assembly, the telescoping end 39 is inserted into the nut 22 and essentially snap fit against the internal face 30 of the nut. In such position, the cover end 40 of the sleeve 24 is positioned extending around and over the first end 32 of the nut 22 and the visual indicator assembly 16. The cover portion 40 of the nut 24 includes windows 42 through which a portion of the visual indicator assembly is visible based on the torque level being applied to the nut, such as either of the first or second visual indicators 18 and 20. An additional intermediate visual indicator 19, if present and positioned between the first and second visual indicators, may be visible (as shown in FIGS. 1 and 2) depending on the rotational position and corresponding torque level that is being applied to the nut. The sleeve 24 further includes pin holes 44 for initially receiving the spring pins 38 to initially align the sleeve with the nut.

The resilient member 26 may be configured as a coil spring having a round, square, or other suitable polygon cross-sectional shape. Alternatively, the resilient member may be configured as a wave spring with a flat or round shape, although a coil spring configuration has proven to be economical with better dimensional adaptability and spring stiffness. Accordingly, the resilient member 26 also is referred to interchangeably as coil spring 26. The coil spring 26 is inserted into the nut 22 oppositely from the sleeve 24. The coil spring 26 has a first end configured as spring leg 48 that extends through the spring groove 36 of the nut, and a second end that is positioned against the sleeve. More particularly, the resilient member or coil spring 26 couples the sleeve to the nut and operates to bias the sleeve 24 in a fixed position while the nut is tightened such that the nut rotates relative to the sleeve, as further detailed below. To facilitate positioning of the coil spring 26 and sleeve 24 within the nut 22, the internal face 30 of the nut 22 may be configured as an undercut that is a deeper cut relative to the minimum full thread depth of the internal threads 28. During the assembly process, the sleeve 24 is pushed through the first end 32 of the nut 22 (which is the non-threaded end). Subsequently, the coil spring 26 is inserted through the second end 34 of the nut 22. As referenced above, the spring leg 48 of the coil spring 26 is inserted though the spring groove 36 to contact and interact against the sleeve 24.

Figure 5:
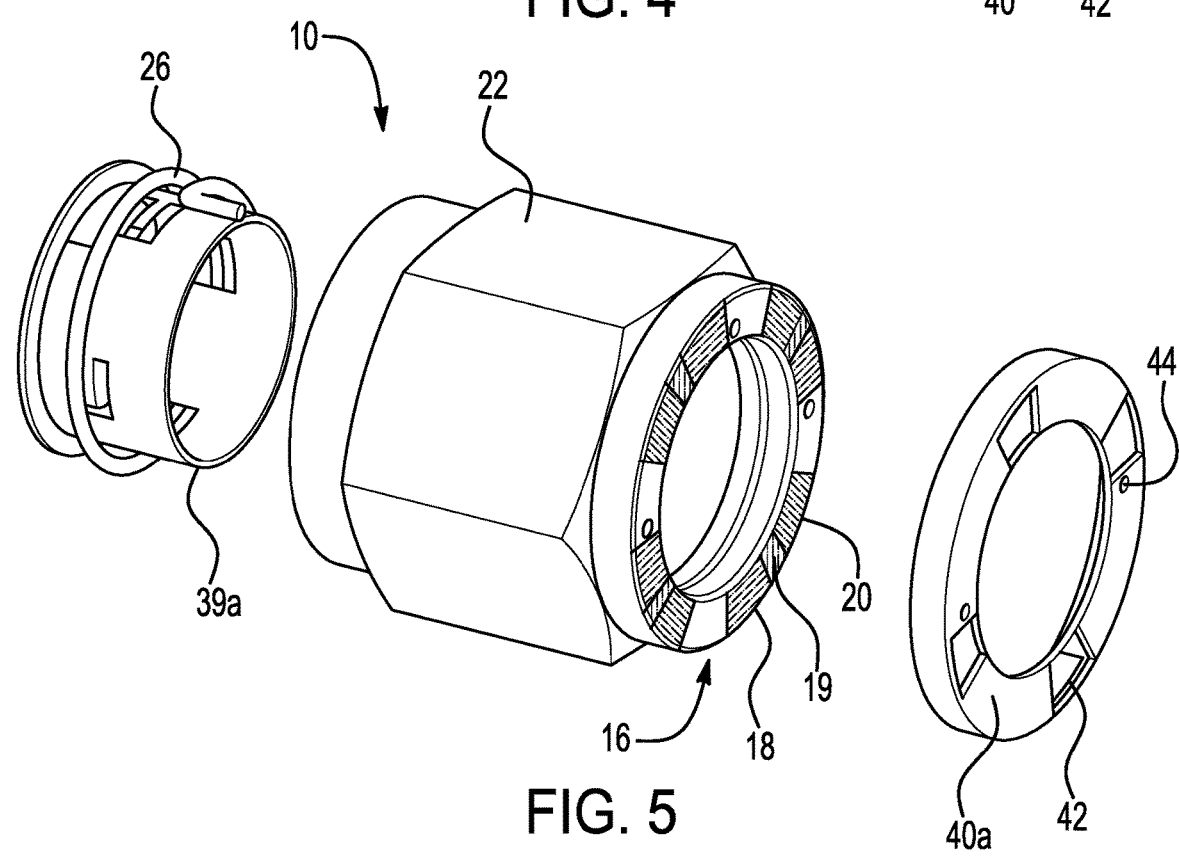
FIG. 5 is a drawing depicting an alternative exploded view of the fitting assembly in which the sleeve is formed initially as multiple pieces.

FIG. 5 is a drawing depicting an alternative exploded view of the fitting assembly 10, in which a sleeve is formed initially as multiple pieces rather than as a single, integral piece as in FIGS. 3 and 4. In this multi-piece sleeve example, the telescoping end 39a initially is formed separately from the cover end 40a. For the sleeve manufactured initially as multiple pieces, the telescoping and cover components are subsequently joined together using any suitable joining method, such as for example by welding, brazing, spot welding, folding, bending, crimping, and/or using an adhesive. The individual sleeve components initially are fabricated using any suitable sheet metal processing, such as for example by stamping, cutting, bending, and rolling. If the sleeve components are made by different processes, then the sleeve may be split radially. During assembly using a multi-piece sleeve, the coil spring 26 first is positioned on the telescoping end 39a, and the resultant assembly is inserted through the second end 34 of the nut 22. In addition, the cover end 40a is positioned in proper alignment over the first end 32 of the nut 22. Once both components 39a and 40a of the sleeve are properly positioned, such components may be joined together using one of the processes referenced above.

Figure 6:
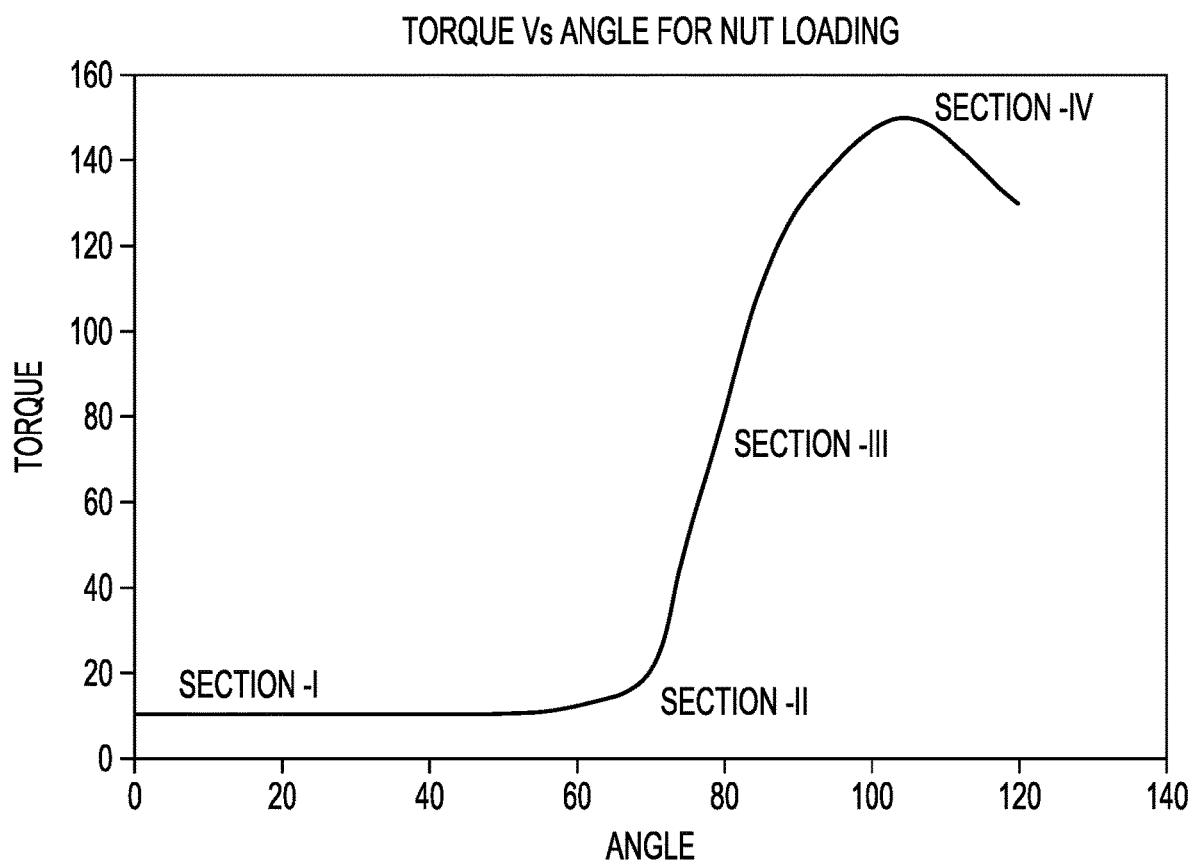
FIG. 6 is a graphical depiction of a typical torque curve illustrating torque versus nut rotational angle for nut loading of a fitting assembly.

To better understand the operation of the fitting assembly 10, the following provides an overview of fundamentals of bolt and nut engineering. In connection with such overview, FIG. 6 is a graphical depiction of a typical torque curve illustrating torque versus nut rotational angle for nut loading. Section I of FIG. 6 corresponds to a minimally or zero torqued state, often corresponding to hand torquing. In Section I, the nut/nipple combination is being moved toward the first fluid section but before contact is made between the nut and the sealing end surface of the first fluid section. Section I, therefore, essentially corresponds to a disconnected state of the fluid sections. In Section II of FIG. 6, the nut and sealing end surface of the first fluid section have made contact. Accordingly, there is no gap between the contact surfaces and the interacting threads are starching and the torque value is increasing. In Section III of FIG. 6, the thread starch and clamp load increase as the nut is tightened. The slope curve for angle vs torque is essentially constant through Section III, with the specific clamp load depending on elasticity of the materials. Section III includes the proper operational torque level, with the specific torque level and positioning on the torque curve within Section III being dependent upon the circumstances and application. Section IV of FIG. 6 corresponds to the torque level being beyond the yield stress limit of the materials and deformation in the plastic reign, and thus the failure of the threading of the fitting assembly may start. Accordingly, it is desirable to tighten the nut until the desired operational torque level within Section III is applied, and Section IV is avoided.

Figure 7:
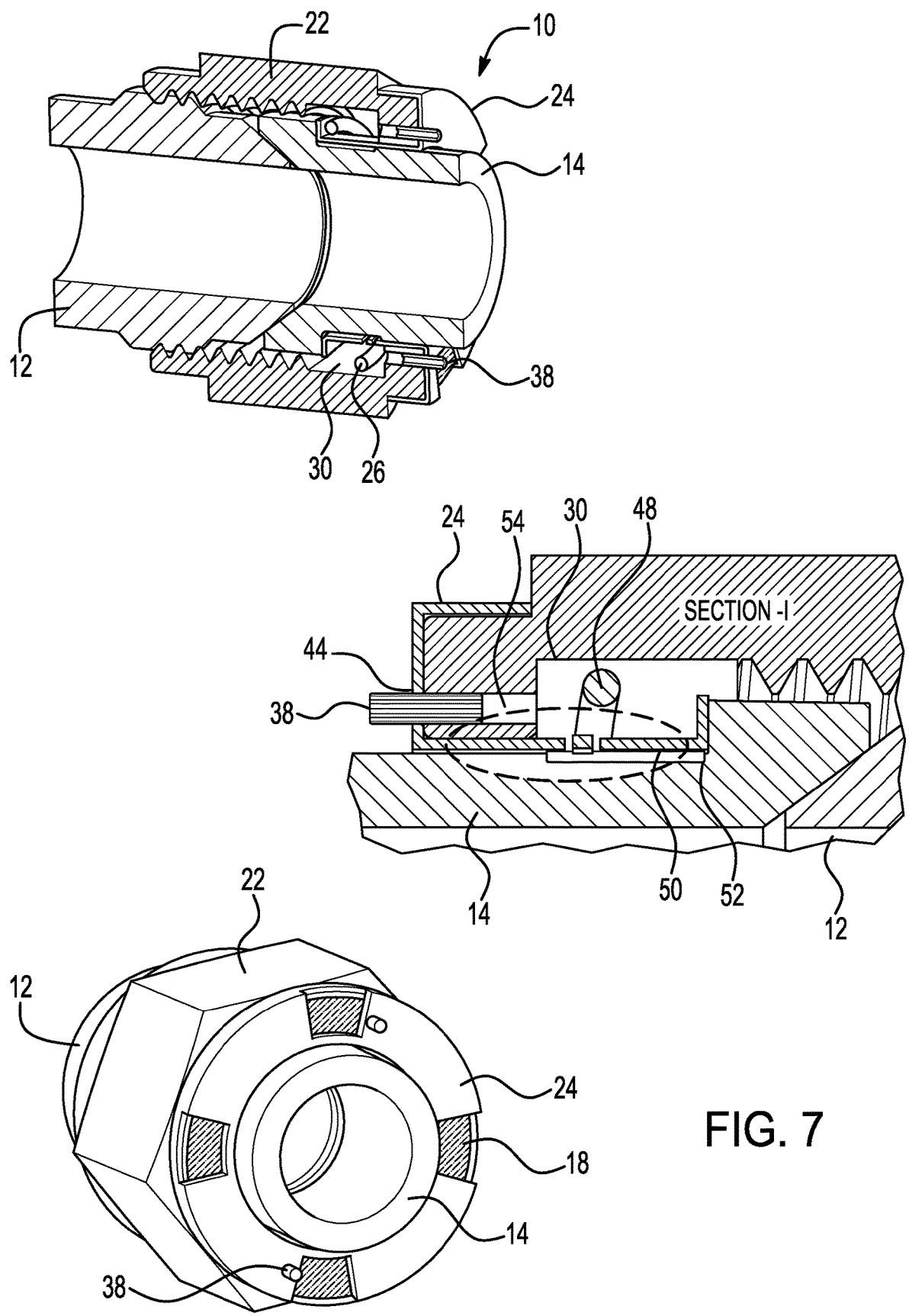
FIG. 7 is a drawing illustrating a side cross-sectional view, close-up view, and perspective view of the fitting assembly configuration during Section I of the torque curve of FIG. 6.

FIG. 7 is a drawing illustrating a side cross-sectional view, close-up view, and perspective view of the fitting assembly configuration during Section I of the torque curve of FIG. 6. The fitting assembly 10 is shown as connecting the first fluid section 12 and the second fluid section 14. In this example, the fitting assembly 10 is employed in a flared fitting configuration in which the first fluid section 12 has a flared end that extends into the nipple or second fluid section 14. Generally, the combined fitting assembly/nipple fluid connection is placed in contact with the flare end of the first fluid section 12. At such first contact, the nut 22 is free to rotate with minimal force, often rotatable by hand, and no secure connection is made between the two fluid sections. The sleeve 24 is maintained in the axial direction along the direction of flow by the coil spring 26, and the sleeve 24 further is held in radial engagement with the nut 22 by the spring pins 38 extending through the outer surface of the sleeve 24.

In particular, more specific attention is directed toward the close-up portion of FIG. 7. The close-up portion more readily illustrates the positioning of the spring leg 48 of the coil spring 26 to maintain the axial position of the sleeve 24 relative to the second fitting section 14. In particular, the spring leg 48 biases the internal flange 50 of the sleeve 24 against a cooperating ledge 52 of the second fluid section 14. The close-up view also more readily illustrates the positioning of one of the spring pins 38 positioned in a nut pin hole 54 formed within the nut 22, and extending beyond an outer surface 56 of the sleeve 24 through the corresponding sleeve pin hole 44. Generally, the spring pin is configurable from an extended position corresponding to a zero-torque state of the torque level being applied to the nut to a retracted position corresponding to a non-zero torque state of the torque level being applied to the nut. In the extended position the spring pin couples the sleeve to the nut such that the sleeve and the nut rotate together, and in the retracted position the spring pin coupling of the sleeve to the nut is disengaged such that the nut rotates independently relative to the sleeve. FIG. 7 illustrates the zero-torque state in which the spring pin 38 couples the sleeve to the nut. The positioning of the spring pins 38 extending beyond the outer surface 56 of the sleeve and into the sleeve pin hole 44 sets an initial position of the sleeve 24 relative to the nut 22. Accordingly, in the extended position the spring pin 38 is positioned in the nut pin hole 54 in the nut and extends through the sleeve pin hole 44 in the sleeve to couple the sleeve to the nut.

In this initial position, as shown in the perspective view of FIG. 7 (bottom portion of FIG. 7), the windows 42 of the sleeve are aligned with the first visual indicators 18. Because in Section I of the torque curve there is no sealed connection of the fluid sections, and the nut is free to rotate with minimal force, the extended spring pins result in the sleeve rotating with the nut such that in Section I the sleeve windows remain aligned with the first visual indicator.

Figure 8:
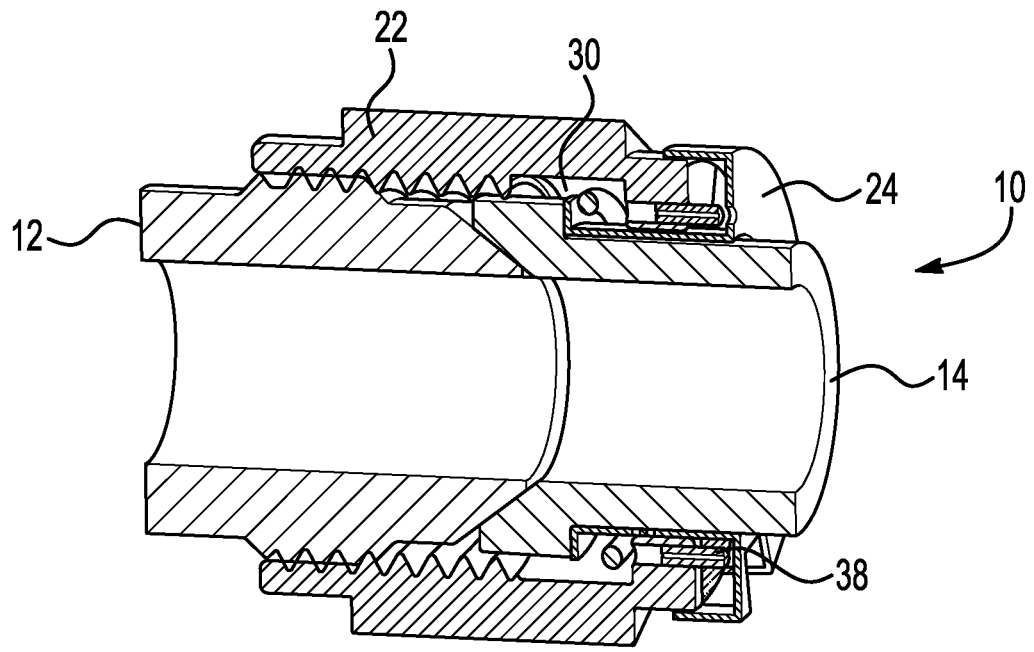
FIG. 8 is a drawing illustrating a side cross-sectional view and a close-up view of the fitting assembly configuration during Section II of the torque curve of FIG. 6.
Figure 8:
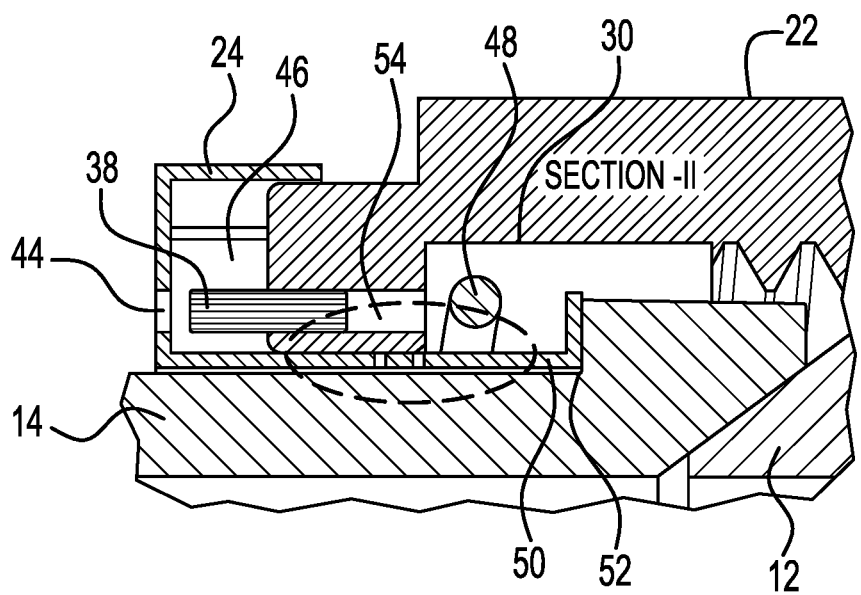

FIG. 8 is a drawing illustrating a side cross-sectional view and a close-up view of the fitting assembly configuration during Section II of the torque curve of FIG. 6. A sealed connection is beginning to form as the two fluid sections 12 and 14 become engaged. The torque level rises and the coil spring 26 compresses to maintain the axial positioning of the sleeve 24 against the flare interaction. As the nut 22 is tightened further and moves axially along the threads, the spring pin 38 retracts from the extended position to a retracted position relative to the pin hole 44 in the sleeve 24, and thus there no longer is a coupling connection between the spring pins 38 and the sleeve, and thus the nut and sleeve are disengaged. Accordingly, in the retracted position the spring pin 38 does not extend through the sleeve pin hole 44 to disengage the nut from the sleeve. As the nut is rotated further during torquing, the spring pin is free to move within a slot 46 formed in the sleeve without imparting commensurate rotation of the sleeve. Relatedly, the sleeve 24 is held in a fixed position due to the knurling or serration on the flare end and the sleeve engagement by the bias of the coil spring. The nut undercut 30 pushes the spring leg downwards further against the sleeve. In this manner, with the sleeve 24 disengaged from the spring pin 38 and held in a fixed position relative to the flare end and the nut, the sleeve 24 is fixed and immobile and the nut 22 is rotatable independently relative to the sleeve. As a result, as the nut rotates relative to the sleeve, the first visual indicator moves out of alignment with the windows 42 of the sleeve.

Figures 9, 10:
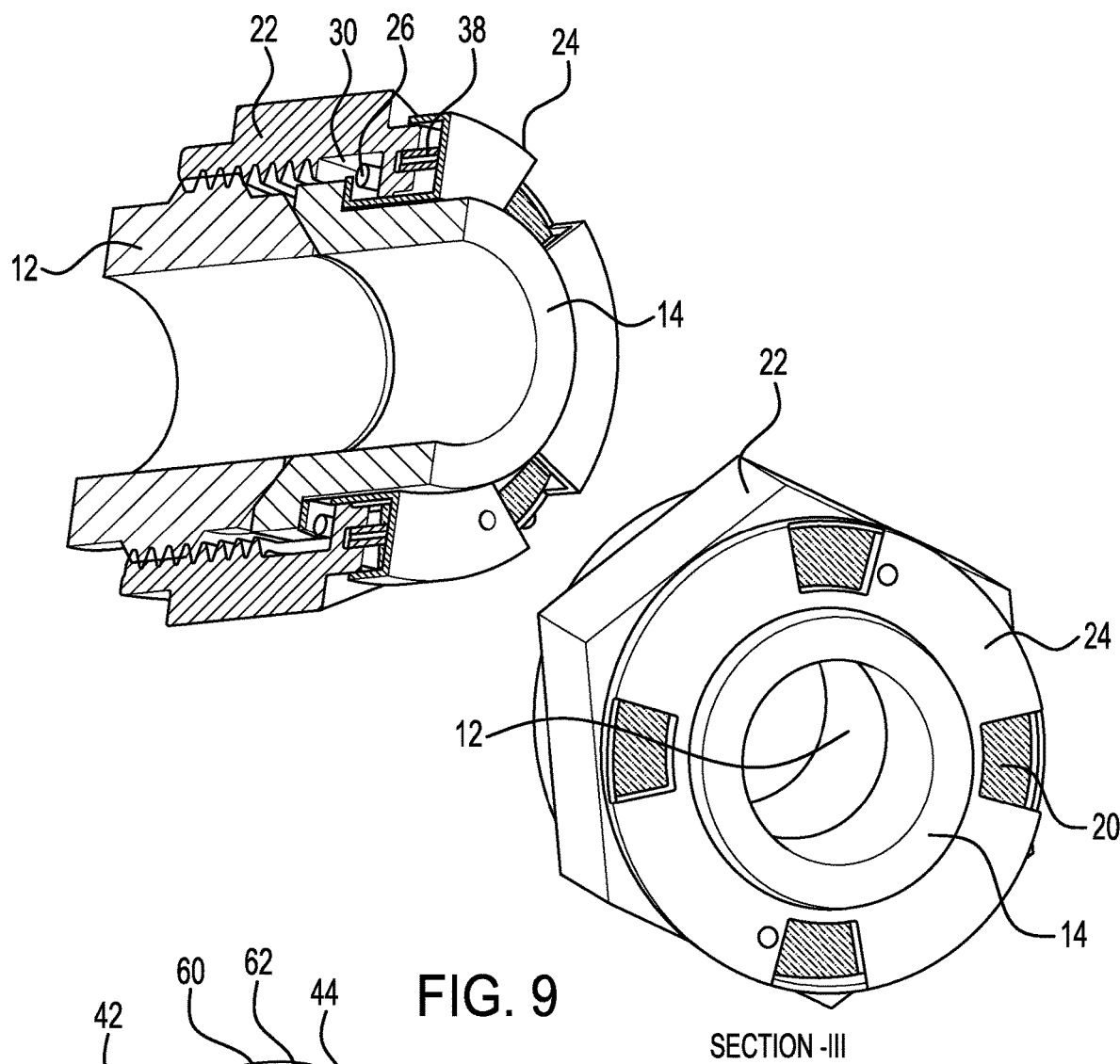
FIG. 9 is a drawing illustrating a side cross-sectional view and a perspective view of the fitting assembly configuration during Section III of the torque curve of FIG. 6.
FIG. 10 is a drawing depicting an alternative embodiment of the sleeve including an audio indicator configured as a protrusion that is formed on an internal side of the cover portion of the sleeve.

FIG. 9 is a drawing illustrating a side cross-sectional view and a perspective view of the fitting assembly configuration during Section III of the torque curve of FIG. 6. As referenced in connection with FIG. 8, during Section II the sleeve 24 is disengaged from the spring pin 38 and held in a fixed position relative to the flare end and the nut, and the sleeve is fixed and immobile and the nut is rotatable independently relative to the sleeve. Disengagement of the sleeve from the nut, and independent movement of the nut relative to the sleeve, is maintained during Section III. As a result, as the nut rotates further relative to the sleeve, the second visual indicator 20 moves into alignment with the windows 42 of the sleeve (perspective view or bottom portion of FIG. 9). In the example in which an intermediate visual indicator is used, such intermediate visual indicator may become aligned with the sleeve windows prior to alignment of the second visual indicator 20, to indicate the fitting assembly is being torque but currently is at an insufficient torque level. In this manner, the visual indicator assembly rotates relative to the sleeve to alter which portion of the visual indicator assembly is visible through the window to provide a visual indication of when the torque level being applied to the nut is a desired operational torque level. The positioning of the second visual indicator 20 is optimized for a given fitting assembly 10 to correspond to the desired operational torque level at the corresponding position on Section III of the torque curve. In this manner, once the second visual indicator is visible through the windows of the sleeve, the operator or user knows that the appropriate operational torque level has been applied, and further torquing of the fitting assembly is prevented. An under-torque finish is avoided, and the torque level also does not enter Section IV of the torque curve (post yield stress) where failure of the fitting assembly can occur.

Figure 11:
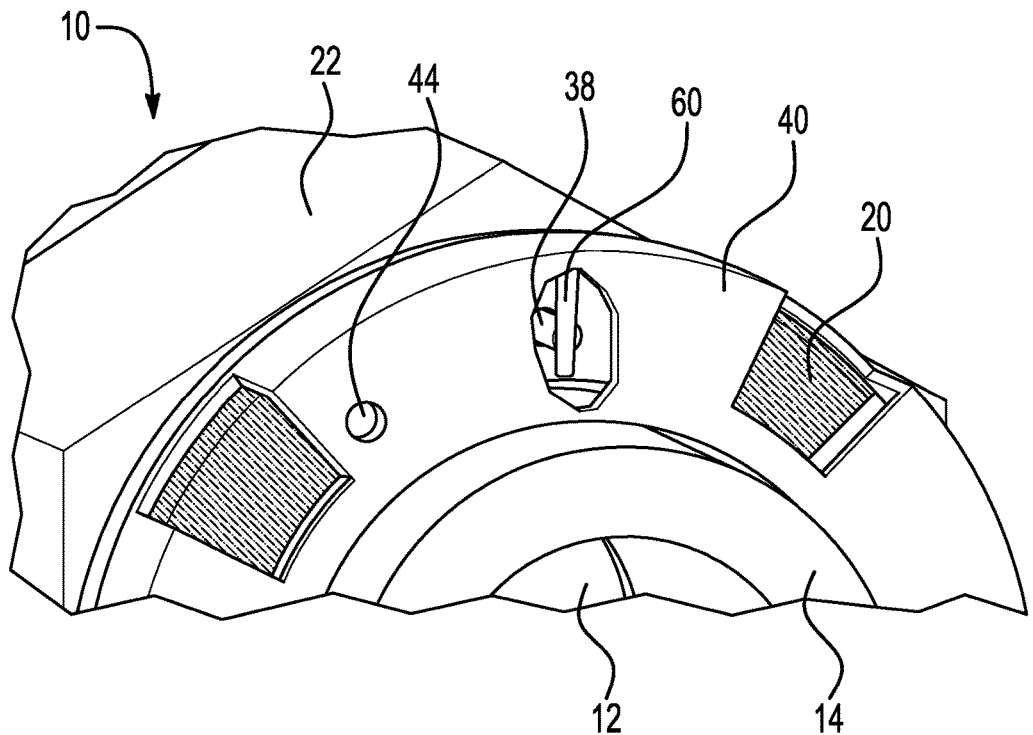
FIG. 11 is a drawing depicting a portion of the fitting assembly that shows operation of the audio indicator of FIG. 10.

Numerous variations on the above configuration may be employed. In one example, the fitting assembly may further include an audio indicator in addition to the visual indicators. The audio indicator may include a protrusion fixed to an internal surface of the sleeve, and as the nut rotates relative to the sleeve, the spring pin contacts the protrusion to provide an audio indication of when the desired operational torque level is being applied to the nut. FIG. 10 is a drawing depicting an embodiment of a sleeve 24a including an audio indicator configured as a protrusion 60 that is formed on an internal surface 62 of the cover portion 40 of the sleeve 24a. FIG. 11 is a drawing depicting a portion of the fitting assembly 10 that shows operation of the audio indicator of FIG. 10. As shown in FIGS. 10 and 11, the audio indicator protrusion 60 may be configured as one or more flat plates or forks that are fixed to the internal surface 62 of the cover portion 40 of the sleeve 24a. The audio indicator protrusion may be fixed by welding, brazing, spot welding, folding, bending, crimping, riveting and/or using an adhesive, or may be formed integrally with the sleeve using a molding or machining process. An arc angle between the audio indicator (flat plate(s)) 60 to spring pin hole(s) 44) is equal to the clamping angle ($\alpha_T$) at the desired operational torque at which the second visual indicator 20 is visible through the windows 42 of the sleeve. When the nut rotates from Section II through Section III of the torque curve, the spring pin 38 will bump over the protrusion audio indicator, and thereby generate a "click" type sound to indicate that the desired operational torque has been reached.

Figure 12:
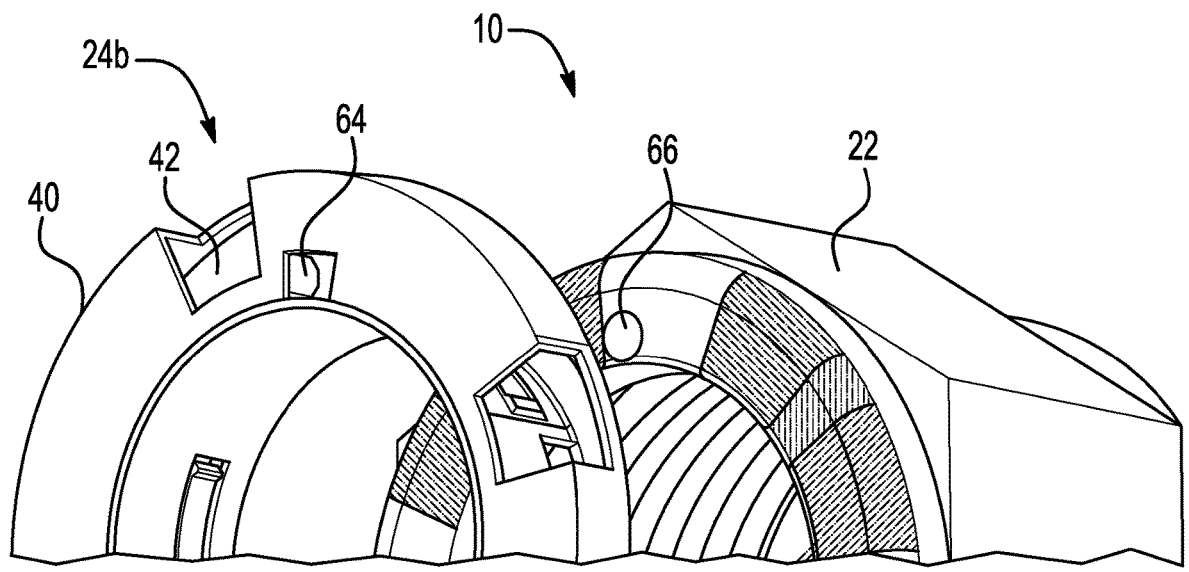
FIG. 12 is a drawing depicting a portion of the fitting assembly including an alternative design of the sleeve in which a spring pin is configured as a bend in the sleeve surface.

As another variation, in an alternative design of the spring pin the spring pin may be configured as a bend in a surface of the sleeve that functions as the spring pin. Generally, in the extended position the sleeve-integrated spring pin is positioned in a nut pin hole in the nut to couple the sleeve to the nut, and in the retracted position the sleeve-integrated spring pin does not extend into the nut pin hole to disengage the nut from the sleeve. FIG. 12 is a drawing depicting a portion of the fitting assembly 10 including an alternative design of a sleeve 24b in which a spring pin 64 is configured as a bend in a surface of the sleeve. The spring pin 64, integrated as part of the sleeve 24b, is inserted into a corresponding nut pin hole 66 formed in the nut 22. The integrated spring pin 64 otherwise operates comparably as the separate spring pin 38 of the previous embodiment. As the nut 22 is rotated for torquing from Section I to Sections II (and in Section III) of the torque curve, the spring pin 64 alters from an extended position to a retracted position to disengage from the nut pin hole 66 with the sleeve 24b being held in place by the coil spring. In this manner, as in the previous embodiment the sleeve 24b is in a fixed position and immobile, and the nut 22 is rotatable independently relative to the sleeve so that the visual indicator assembly 16 moves relative to the windows 42 of the sleeve. By integrating the spring pin structure as part of the sleeve, such integration eliminates cost and complexity associated with configuring the spring pin as a separate component. In the integrated spring pin configuration, with the pin hole 66 in the nut engaging the spring pin 64 formed as a sleeve bend, the overall working length of the nut is beneficially reduced.

Figure 13:
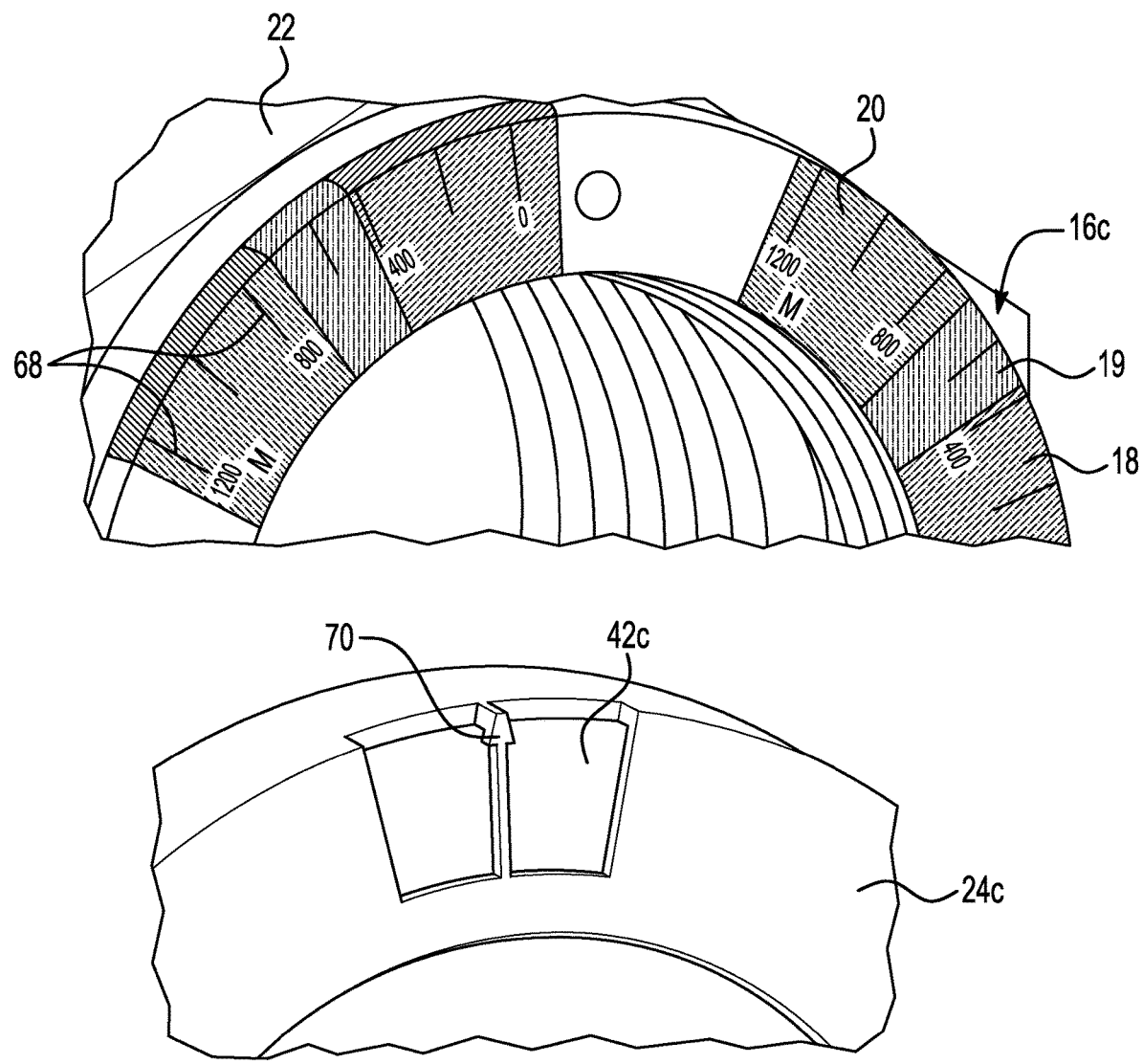
FIG. 13 is a drawing depicting an exemplary visual indicator assembly and an associated portion of a sleeve, in which the visual indicator assembly includes torque value markings.

As another variation, the visual indicator assembly may include torque value markings to provide a more precise indication of the level of torque being applied to the nut. In such example, the visual indicator assembly further includes a plurality of torque level markings corresponding to different torque levels, and the sleeve further includes a pointer positioned in the window that points to one of the plurality of torque level markings corresponding to a torque level being applied to the nut. FIG. 13 is a drawing depicting an exemplary visual indicator assembly 16c and an associated portion of a modified sleeve 24c, in which the visual indicator assembly includes torque value markings 68. Torque value markings 68 may be applied using any suitable marking method, such as for example MOPA laser marking methods or other suitable methods described above in connection with generally forming the visual indicator assembly. As shown in FIG. 13, the content of the markings, for example, may resemble a torque wrench dial and include numerical values corresponding to the applied torque. The content of the torque value markings additionally or alternatively may include qualitative torque indications, such as for example Min (minimum), Nom (nominal), and Max (maximum). To associate a particular torque value marking with the torque being applied, a window 42c of the sleeve 24c may be formed to include a pointer 70. In use, the pointer 70 aligns with a particular torque value marking 68 to indicate the value of the applied torque at the respective rotational position of the nut.

Figure 14:
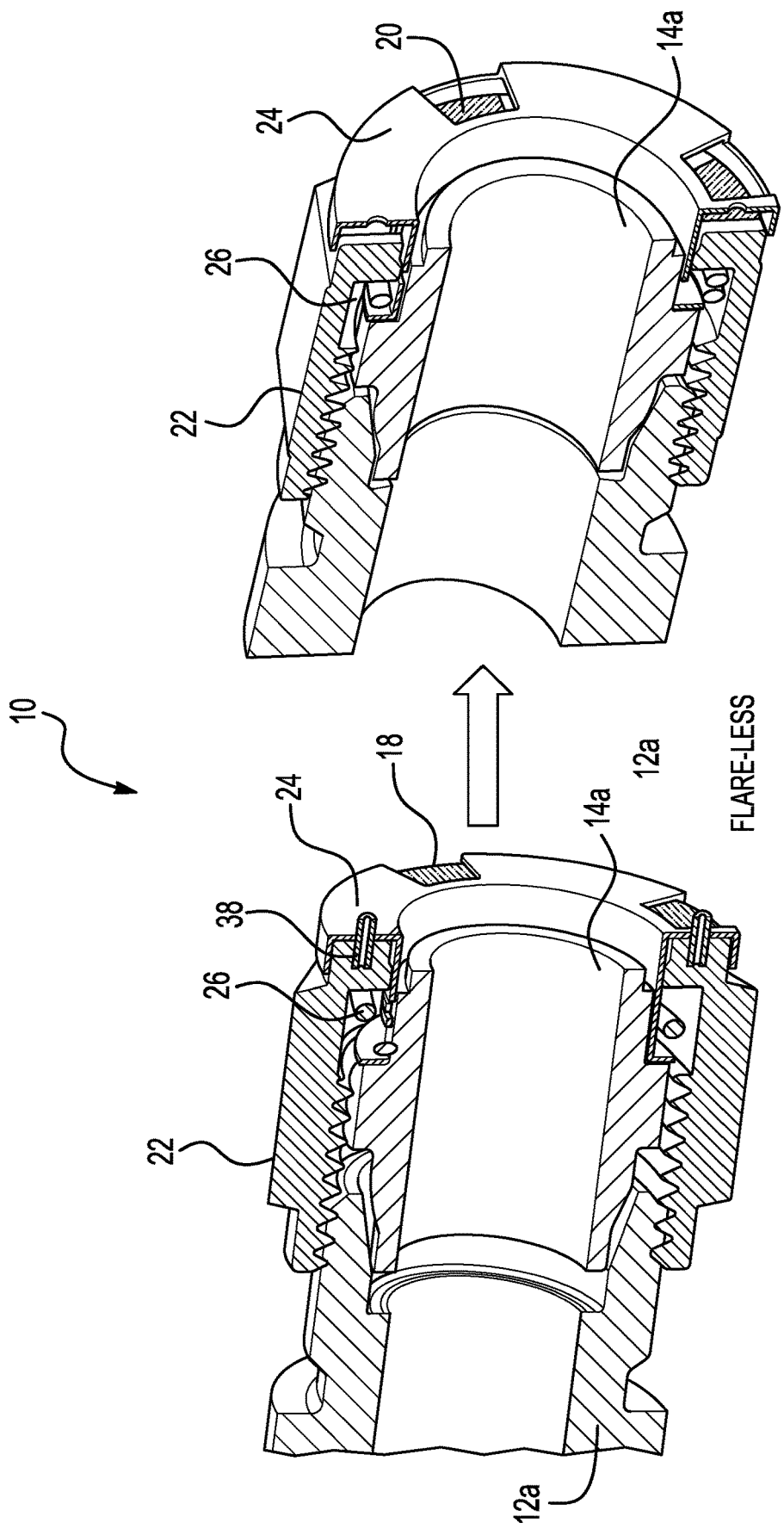
FIG. 14 is a drawing depicting the fitting assembly in use in a flareless end fitting configuration.
Figure 15:
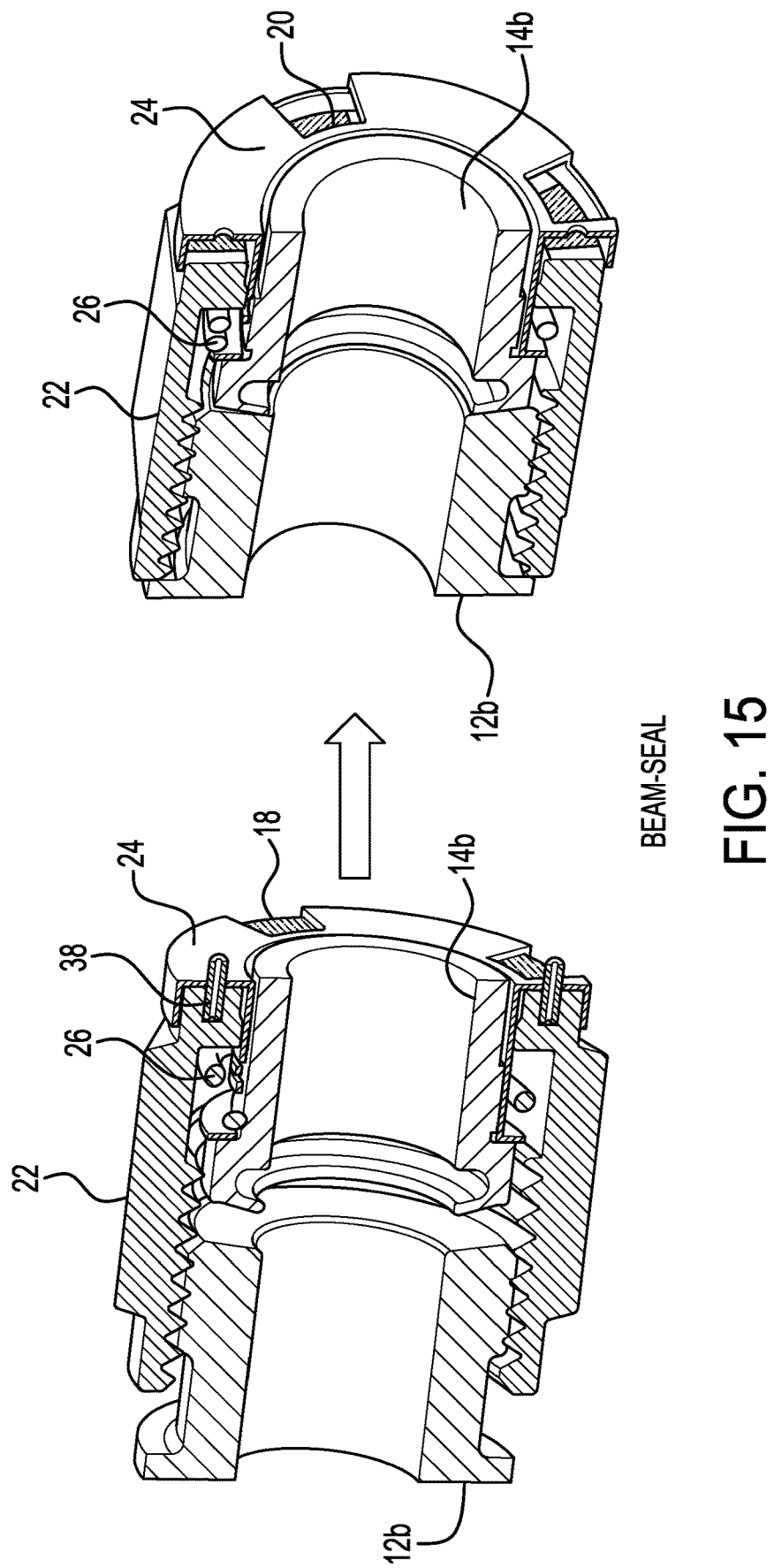
FIG. 15 is a drawing depicting the fitting assembly in use in a beam seal fitting configuration.

In previous embodiments, the fitting assembly 10 and the related variations are employed in connection with a flare end fitting configuration. The fitting assembly 10 is not limited to a flare end fitting configuration. For example, FIG. 14 depicts the fitting assembly 10 in use in a flareless end fitting configuration in which a first fluid section 12a does not have a flare end inserted into a second fluid section (nipple) 14a. FIG. 15 depicts the fitting assembly 10 in use in a beam seal configuration in which a first fluid section 12b and a second fluid section 14b mate and seal at planar surfaces. In FIGS. 14 and 15, the left portions illustrate the fitting assembly in the disconnected state, and thus the first visual indicator 18 is visible. The right portions illustrate the fitting assembly in the connected state with the desired operational torque value being applied, and thus the second visual indicator 20 is visible. Accordingly, the fitting assembly 10 is suitable for providing torque indications in any suitable end configuration of the connected fluid sections.

Figure 16:
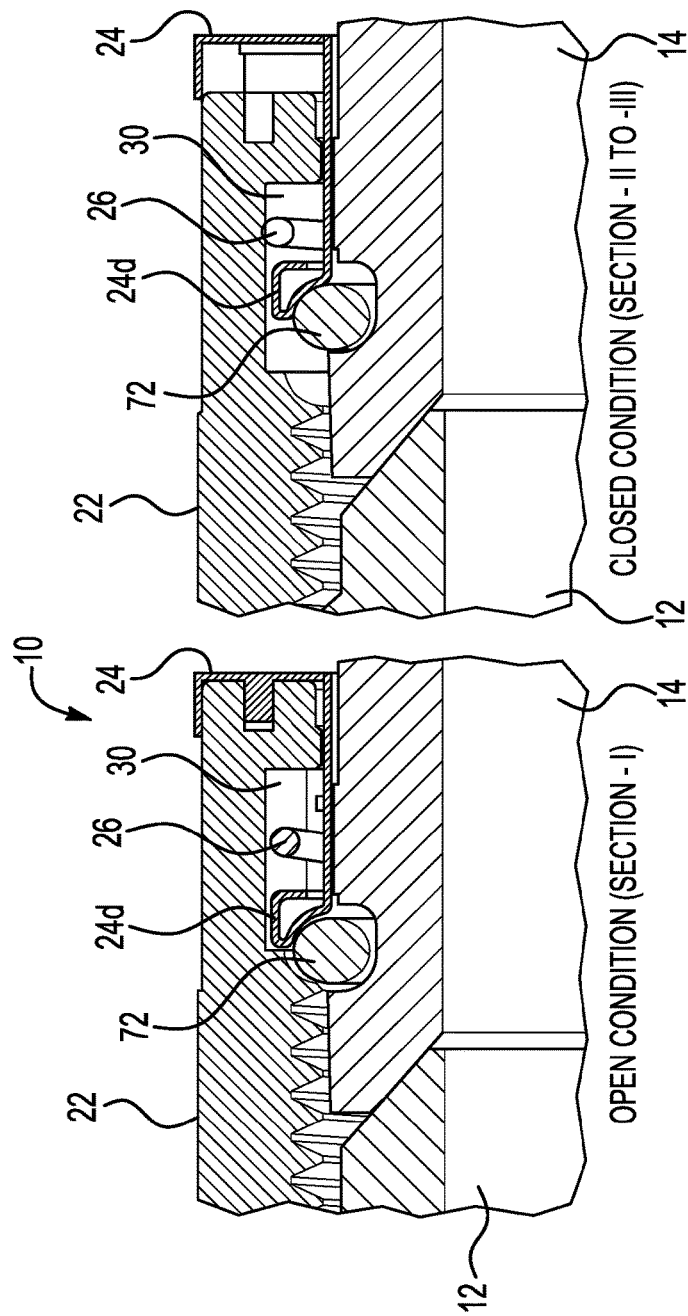
FIG. 16 is a drawing depicting the fitting assembly in use in a wire-on-nut fitting configuration.

In certain applications, a wire-on-nut design, in which a locking wire is employed to maintain positioning of the nut, is most suitable. For example, a wire-on-nut design typically is used in jump size fittings, elbow fittings and similar forgings and bend tubes of higher size, and fitting seal ends with hex-on-nipple designs. The fitting assembly 10 also is adaptable for use in a wire-on-nut design. FIG. 16 is a drawing depicting the fitting assembly 10 in use in a wire-on-nut fitting configuration, with the left portion indicating the no-torque state of Section I of the torque curve, and the right portion indicating the torquing state of Sections II and III of the torque curve. In the wire-on-nut configuration, a wire 72 is positioned within a groove formed within the nut 22 that is positioned adjacent to the second fluid section 14 and positioned against a portion of the sleeve 24. The sleeve 24 includes an end 24d that is modified to accommodate the wire 72. As the nut is tightened, the wire moves along the undercut 30 formed in the nut 22 that receives the sleeve 24 and coil spring 26. The fitting assembly 10 otherwise operates comparably as previous embodiments in relation to providing a visual indication of the torque level being applied.

In exemplary embodiments, the connection of the fitting assembly 10 to the second fluid section (nipple fluid section) 14 may include a positive locking feature that provides resistance to nut loosening. Nut loosening is a major issue in fluid connector and fastener applications in which nuts are used to secure the connection of components of various materials at different operating conditions, such as vibration, temperature, and environmental hazards. There are two principal reasons for nut loosening. Slackening refers to a static phase nut loosening characterized by a loss of clamp load or thread pretension, or material or strain relaxation. In static slackening, such losses occur without the nut rotating a noticeable angle or distance. Spontaneous loosening is a dynamic phase nut loosening in which there is substantial rotation or movement of the nut due to vibration, environmental conditions, and/or external load conditions. In fluid connector applications, dynamic spontaneous loosening may be prevented using a safety wire such as in the wire-on-nut configuration described above, or by employing a positive lock fitting such as for example a spring-loaded detent with serration on the fluid section.

Figure 17:
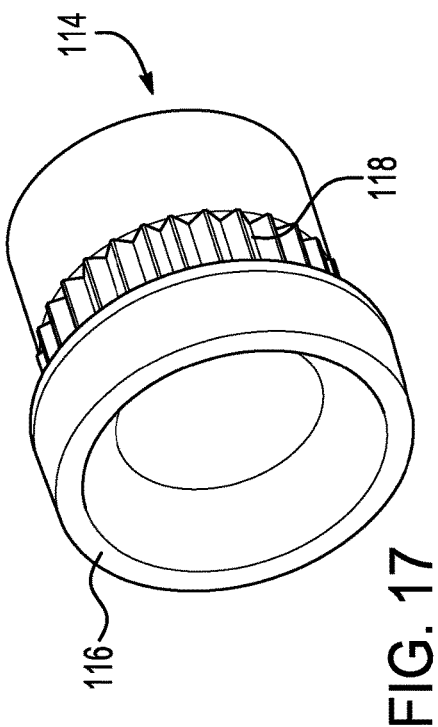
FIG. 17 is a drawing depicting a fluid section that has been modified to have a serrated portion to provide a positive locking feature.

FIG. 17 is a drawing depicting an exemplary nipple fluid section 114 that has been modified to include a serrated portion to provide a positive locking feature. The fluid section 114 has a connection end 116 that receives or is connected to the first fluid section 12. The fluid section 114 further includes a serrated portion 118 that is adjacent to the connection end 116. Although FIG. 17 depicts a flare end fitting configuration, comparable principles may be applied to other fitting end configurations such as, for example, flareless or beam seal end fitting configurations. The fitting assembly includes a positive locking feature that interacts with the serrated portion of the nipple fluid section to positively lock a position of the nut to prevent nut loosening during use.

Figure 18:
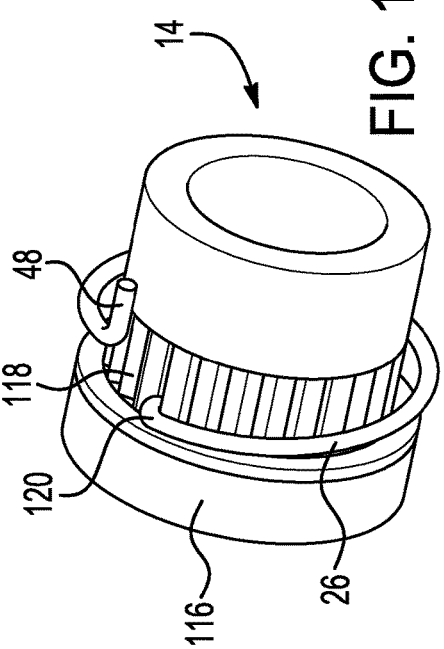
FIG. 18 is a drawing depicting the fluid section of FIG. 17 in combination with the coil spring to provide the positive locking feature.
Figure 19:
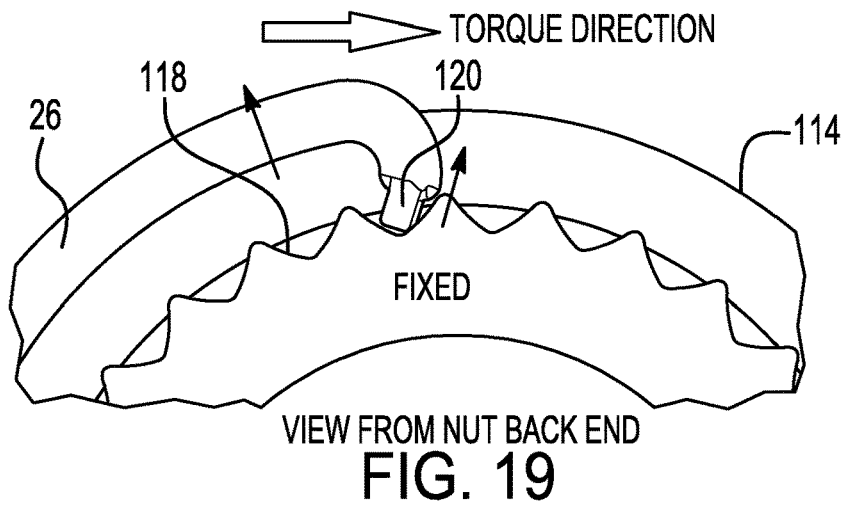
FIG. 19 is a drawing depicting a side and close-up view derived from a portion of FIG. 18 and illustrating the torque directions of the coil spring and the serrated portion of the fluid section.

In exemplary embodiments, the positive locking feature includes a vertical spring leg of the resilient member, and the vertical spring leg moves up and down over the serrated portion of the nipple fluid section such that when the desired operational torque level is applied to the nut, the vertical spring leg is positioned within a groove of the serrated portion to positively lock the position of the nut. The interaction between the coil spring end vertical spring leg and the serration creates a self-locking, positive lock feature that prevents or inhibits nut movement and/or rotation, thereby avoiding nut loosening. FIG. 18 is a drawing depicting the nipple fluid section 114 of FIG. 17 in combination with the coil spring 26 to provide the positive locking feature. FIG. 19 is a drawing depicting a side and close-up view derived from a portion of FIG. 18 and illustrating the torque directions of the coil spring 26 and the serrated portion 118 of the fluid section 114. One end of the spring (parallel to the axial direction) is attached to the nut comparably as in previous embodiments, and the opposite end of the coil spring is floating on the serrated portion of the fluid section. In particular, the opposite end of the coil spring 26 has a vertical spring leg 120 (parallel to the radial direction) that is floating on the serrated portion 118 of the fluid section 114. The vertical spring leg 120 of the coil spring will move up and down along the serrated portion 118 as the nut is rotated for tightening. Once the nut is tightened to the desired operational torque level, the vertical spring leg 120 is positioned to be engaged into a serration groove of the serrated portion 118 to prevent nut rotation and loosening. The vertical spring leg 120 may be oriented at an angle relative to the radial direction of the nipple fluid section 114, and the angle of the vertical spring leg with respect to radial direction can be an acute, right, or obtuse angle.

Figure 20:
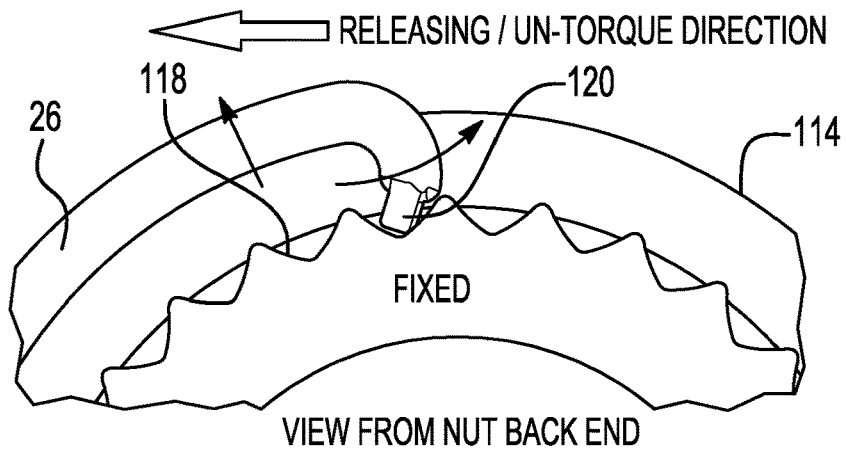
FIG. 20 is a drawing depicting a variation of FIG. 19 illustrating torque directions during releasing the fitting assembly.

As referenced above, FIG. 19 illustrates torque directions during nut tightening. During nut tightening and in the connected state, the torque direction is such that the vertical spring leg of the coil spring will tend to remain within the serration groove to provide the positive locking. FIG. 20 is a drawing depicting a variation of FIG. 19 illustrating torque directions during releasing the fitting assembly, such as when the nut intentionally is loosened for maintenance or repair purposes. When releasing the fitting assembly, the force directions tend to move the vertical spring leg to bend outwards to move or slide over the knurled surface of the serrated portion. The additional bending moment will create extra torque in the releasing direction, but the extra torque when not releasing is in a direction that tends to impart the positive locking feature. In this manner, the fitting assembly can be readily released for maintenance and repair while ensuring a strong positive lock during use.

Figure 21:
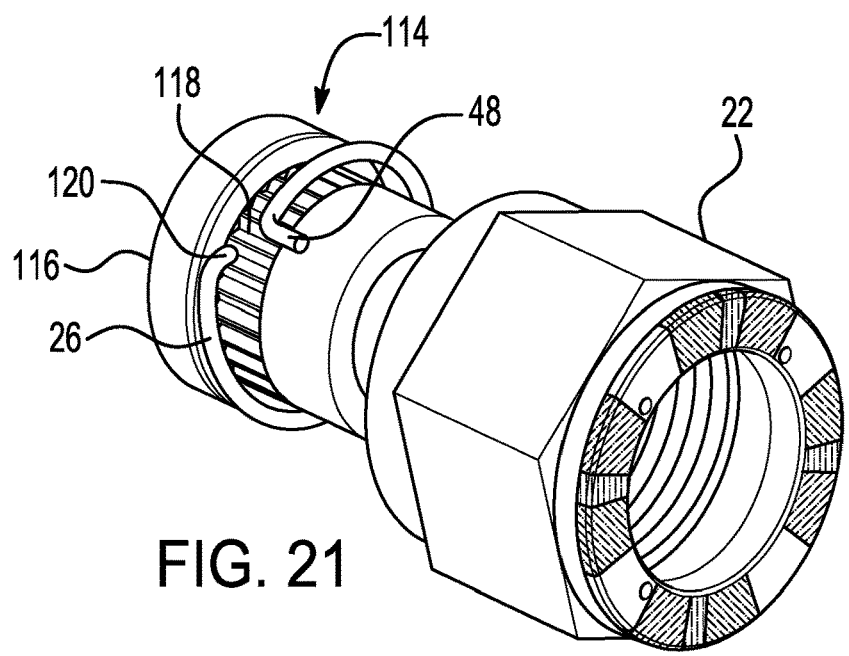
FIG. 21 is a drawing depicting an exploded view of the coil spring positioned relative to the fluid section, in combination with the nut, for providing the positive locking feature.

FIG. 21 is a drawing depicting an exploded view of the coil spring 26 positioned on the fluid section 114, in combination with the nut 22. The sleeve is omitted form FIG. 21 for convenient illustration. Once the fluid section 114 is inserted into the nut, the coil spring 26 will be positioned relative to the nut comparably as in previous embodiments.

FIG. 22 is a drawing depicting operation of the positive locking feature of the fitting assembly. In the depiction of FIG. 22, the nut is omitted for simplicity of illustration. FIG. 22 illustrates the configuration of the sleeve 24 in combination with the fluid section 114 and coil spring 26 to provide the positive locking feature. The left portion of FIG. 22 illustrates the configuration through operation corresponding through Sections I and II of the torque curve, and the right portion of FIG. 22 illustrates the configuration through operation corresponding through Section III of the torque curve. In exemplary embodiments, the sleeve includes a contact surface, and the vertical spring leg slides over the contact surface during a portion of nut rotation during which an insufficient torque level is being applied to the nut. The sleeve further includes a locking window positioned adjacent to the sliding surface, and when the desired operational torque level is applied to the nut the vertical spring leg is positioned through the locking window to be positioned within a groove of the serrated portion of the nipple fluid section. Referring to FIG. 22 in particular, the sleeve 24 includes a contact surface 121 against which the vertical spring leg 120 slides in contact during the Sections I and II operation in which a zero or insufficient torque level is being applied. The sleeve 24 also has a locking window 122 through which the vertical spring leg 120 extends during the Section III operation during which the desired operational torque value becomes applied.

During Section I operation corresponding to the initial state of the non-torqued fitting assembly, the vertical spring leg 120 is in contact with the contact surface 121 of the sleeve 24, and therefore the positive locking feature is not engaged. As referenced above, during Section II operation the sleeve becomes disengaged from the nut, with the sleeve being fixed and immobile and the nut rotating independently relative to the sleeve. As the nut rotates independently through the Section II operation, when torque is applied but is insufficient, the coil spring rotates with the nut to become energized. The vertical spring leg 120 slides across the contact surface 121 of the stationary sleeve 24. During at least a portion of the Section III operation, the vertical spring leg 120 becomes aligned with the locking window 122, which exposes a portion of the serrated portion 118 of the fluid section 114. Due to the spring bias, the vertical spring leg 120 extends through the locking window 122 to engage with the serrated portion 118 to engage the positive locking feature as the operational torque value is reached.

In certain conventional configurations, an analogous positive lock spring is always engaged with the serration or a flat surface of the attached fluid section. In the design of the present disclosure in which the vertical spring leg contacts against the sleeve through a portion of the torquing operation, the positive locking feature is engaged when approximately 75% of the nominal torque value is reached when tightening the nut, and will be disengaged when the torque value goes below approximately 75% of the nominal torque value when loosening the nut (such as for maintenance and repair). Accordingly, the locking window 122 is sized and positioned on the sleeve 24 to have the spring leg engagement/disengagement at approximately 75% of the desired operational torque value. In this manner, the contact surface and the locking window of the sleeve are positioned such that the vertical leg spring slides against the contact surface during nut rotation when the torque level being applied to the nut is approximately 75% of the desired operational torque level or less, and the vertical leg spring extends through the window and moves up and down over the serrated portion of the nipple fluid section when the torque level being applied to the nut is more than approximately 75% of the desired operational torque level. Such operation improves the operation of the locking feature to provide effective positive locking while rendering manual nut loosening easier.

FIG. 23 is a drawing depicting an alternative design of a sleeve 124 for providing an additional or alternative positive locking feature. In the example of FIG. 23, the positive locking feature includes a spring tab of the sleeve that ends in a pawl, and the spring tab moves up and down over the serrated portion of the nipple fluid section such that when the desired operational torque level is being applied to the nut, the pawl is positioned within a groove of the serrated portion to positively lock the position of the nut. Referring to FIG. 23 in particular, a sleeve 124 includes a spring tab 126 that ends in a pawl 128. As the nut is rotated, the spring tab 126 will rise and fall over the serrations of the serrated portion 118 of the fluid section 114 until the correct operational torque level is reached. The pawl 128 then remains locked within one of the serration grooves to enhance the positive locking of the fitting assembly to the fluid section.

The fitting assembly embodiments of the present disclosure also may be used in combination with electronic torque sensing components. For example, an electronic proximity sensor may be used for maximum torque indication or nut loosening and displayed to an electronic display device by a wired or wireless electronic connection. An electrical circuit board may be attached to the back side of the sleeve, and the spring pin movement can be measured by a resistance or capacitance change. Such change in resistance or capacitance can be calibrated to a torque value and likewise displayed to an electronic display device by a wired or wireless electronic connection.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A fitting assembly comprising:
a nut having a first end and a second end opposite from the first end;
a visual indicator assembly positioned on the first end of the nut, the visual indicator assembly comprising a plurality of visual indicators that provide a visual indication of a torque level being applied to the nut;
a sleeve attached to the nut and including a window through which a portion of the plurality of visual indicators is visible based on the torque level being applied to the nut; and
a resilient member that couples the sleeve to the nut;
wherein as the nut is rotated to apply torque to the nut, the resilient member biases the sleeve in a fixed position and the nut rotates relative to the sleeve, whereby the visual indicator assembly rotates relative to the sleeve to alter which portion of the visual indicator assembly is visible through the window to provide a visual indication of when the torque level being applied to the nut is a desired operational torque level.

2. The fitting assembly of claim 1, wherein the sleeve comprises a telescoping portion that is positioned inserted within the nut, and a cover portion that is positioned extending around and over the first end of the nut and the visual indicator assembly.

3. The fitting assembly of claim 1, wherein the resilient member is a coil spring having a first end configured as a spring leg that is positioned inserted within a spring groove formed in the nut, and a second end that is positioned against the sleeve.

4. The fitting assembly of claim 1, further comprising a spring pin that is configurable from an extended position corresponding to a zero-torque state of the torque level being applied to the nut to a retracted position corresponding to a non-zero torque state of the torque level being applied to the nut;

wherein in the extended position the spring pin couples the sleeve to the nut such that the sleeve and the nut rotate together, and in the retracted position the spring pin coupling of the sleeve to the nut is disengaged such that the nut rotates relative to the sleeve.

5. The fitting assembly of claim 4, wherein the spring pin is a separate component from the nut and the sleeve, and wherein in the extended position the spring pin is positioned in a nut pin hole in the nut and extends through a sleeve pin hole in the sleeve to couple the sleeve to the nut, and in the retracted position the spring pin does not extend through the sleeve pin hole to disengage the nut from the sleeve.

6. The fitting assembly of claim 5, wherein the spring pin has a spiraled or rolled pin configuration.

7. The fitting assembly of claim 5, further comprising an audio indicator including a protrusion fixed to an internal surface of the sleeve, wherein as the nut rotates relative to the sleeve, the spring pin contacts the protrusion to provide an audio indication of when the desired operational torque level is being applied to the nut.

8. The fitting assembly of claim 4, wherein the spring pin is configured as a bend in a surface of the sleeve, and wherein in the extended position the spring pin is positioned in a nut pin hole in the nut to couple the sleeve to the nut, and in the retracted position the spring pin does not extend into the nut pin hole to disengage the nut from the sleeve.

9. The fitting assembly of claim 1, wherein the visual indicator assembly comprises a first visual indicator that indicates an insufficient torque level is being applied to the nut, and a second visual indicator different from the first visual indicator that indicates the desired operational torque level is being applied to the nut.

10. The fitting assembly of claim 9, wherein the visual indicator assembly further comprises an intermediate visual indicator that is different from and positioned between the first visual indicator and the second visual indicator; and wherein the first visual indicator indicates a zero torque level being applied to the nut, the intermediate visual indicator indicates that a non-zero but insufficient torque level is being applied to the nut, and the second visual indicator indicates that the desired operational torque level is being applied to the nut.

11. The fitting assembly of claim 9, wherein the visual indicator assembly further comprises a plurality of torque level markings corresponding to different torque levels, and the sleeve further comprises a pointer positioned in the window that points to one of the plurality of torque level markings corresponding to a torque level being applied to the nut.

12. The fitting assembly of claim 1, wherein the second end of the nut includes internal threads for connecting with external threads of a fluid section, and the nut further includes an undercut that receives a portion of the sleeve, the undercut being a deeper cut relative to a minimum full thread depth of the internal threads.

13. The fitting assembly of claim 1, further comprising a wire positioned within a groove in the nut and against a portion of the sleeve.

14. A fluid connection assembly comprising:

the fitting assembly according to claim 1; and a nipple fluid section that is connected to the nut through the first end of the nut.

15. The fluid connection assembly of claim 14, wherein the nipple fluid connection includes an external surface having a serrated portion, and the fitting assembly includes a positive locking feature that interacts with the serrated portion of the nipple fluid connection to positively lock a position of the nut to prevent nut loosening during use.

16. The fluid connection assembly of claim 15, wherein the positive locking feature comprises a vertical spring leg of the resilient member, and the vertical spring moves up and down over the serrated portion of the nipple fluid section such that when the desired operational torque level is applied to the nut, the vertical spring leg is positioned within a groove of the serrated portion to positively lock the position of the nut.

17. The fluid connection assembly of claim 16, wherein the sleeve includes a contact surface, and the vertical spring leg slides over the contact surface during a portion of nut rotation during which an insufficient torque level is being applied to the nut; and wherein the sleeve further includes a locking window positioned adjacent to the sliding surface, and when the desired operational torque level is applied to the nut the vertical spring leg is positioned through the locking window to be positioned within the groove of the serrated portion of the nipple fluid section.

18. The fluid connection assembly of claim 17, wherein the contact surface and the locking window of the sleeve are positioned such that the vertical leg spring slides against the contact surface during nut rotation when the torque level being applied to the nut is 75% of the desired operational torque level or less, and the vertical leg spring extends through the window and moves up and down over the serrated portion of the nipple fluid section when the torque level being applied to the nut is more than 75% of the desired operational torque level.

19. The fluid connection assembly of claim 16, wherein the vertical spring leg is oriented at an angle relative to a radial direction of the nipple fluid section.

20. The fluid connection assembly of claim 15, wherein the positive locking feature includes a spring tab of the sleeve that ends in a pawl, and the spring tab moves up and down over the serrated portion of the nipple fluid section such that when the desired operational torque level is being applied to the nut, the pawl is positioned within a groove of the serrated portion to positively lock the position of the nut.

* * * * *